United States Patent
Snuggerud et al.

(10) Patent No.: US 10,191,464 B2
(45) Date of Patent: Jan. 29, 2019

(54) NOTIFICATION MANAGEMENT SYSTEMS AND METHODS FOR MONITORING THE OPERATION OF A MODULAR POWER PLANT

(71) Applicant: NuScale Power, LLC, Corvallis, OR (US)

(72) Inventors: Ross Snuggerud, Corvallis, OR (US); Kevin LaFerriere, Corvallis, OR (US)

(73) Assignee: NuScale Power, LLC, Corvallis, OR (US)

( * ) Notice: Subject to any disclaimer, the term of this patent is extended or adjusted under 35 U.S.C. 154(b) by 470 days.

(21) Appl. No.: 14/994,255

(22) Filed: Jan. 13, 2016

(65) Prior Publication Data

US 2017/0046057 A1 Feb. 16, 2017

Related U.S. Application Data

(60) Provisional application No. 62/205,084, filed on Aug. 14, 2015.

(51) Int. Cl.
*G08B 21/00* (2006.01)
*G05B 19/048* (2006.01)
(Continued)

(52) U.S. Cl.
CPC ............ *G05B 19/048* (2013.01); *G05B 15/02* (2013.01); *G05B 23/0267* (2013.01);
(Continued)

(58) Field of Classification Search
None
See application file for complete search history.

(56) References Cited

U.S. PATENT DOCUMENTS

| | | |
|---|---|---|
| 2012/0036250 A1 | 2/2012 | Vaswani et al. |
| 2012/0219101 A1 | 8/2012 | L'Abbate et al. |
| 2012/0271587 A1* | 10/2012 | Shibuya ............ G05B 23/0229 702/127 |

FOREIGN PATENT DOCUMENTS

| | | |
|---|---|---|
| JP | 11-149312 | 6/1999 |
| JP | 2002215227 | 7/2002 |

(Continued)

OTHER PUBLICATIONS

Authorized Officer Mineko Mohri, International Preliminary Report on Patentability and Written Opinion, International Application No. PCT/US2016/024558, dated Feb. 20, 2018, 9 pages.

(Continued)

*Primary Examiner* — Adolf Dsouza
(74) *Attorney, Agent, or Firm* — Fish & Richardson P.C.

(57) ABSTRACT

A system for managing notifications for a modular power plant that includes one or more power-generation module (PGM) assemblies and one or more common-systems (CS) includes a transceiver that receives data over a network; a display device that displays a graphical display; a memory that stores at least instructions; and a processor device that executes instructions that perform actions. The actions include receiving power plant data over the network that includes signals generated by one or more sensors included in at least one of the PGM assemblies or one of the CS; detecting an event based on the power plant data and one or more notification thresholds; in response to the event, determining a notification type based on the data and the one or more notification thresholds; providing a notification to a user via the graphical display based on the notification type and the event; and enabling the user to acknowledge the notification.

29 Claims, 16 Drawing Sheets

(51) Int. Cl.
   *G05B 15/02*     (2006.01)
   *G05B 23/02*     (2006.01)
(52) U.S. Cl.
   CPC .............. *G05B 2219/24015* (2013.01); *G05B 2219/2639* (2013.01); *Y04S 10/522* (2013.01)

(56) References Cited

FOREIGN PATENT DOCUMENTS

| | | |
|---|---|---|
| JP | 2003114294 | 4/2003 |
| JP | 2009-151398 | 7/2009 |
| JP | 2012073874 | 4/2012 |
| KR | 100798006 | 1/2008 |
| WO | 91-06960 | 5/1991 |
| WO | 2005-109126 | 11/2005 |

OTHER PUBLICATIONS

Authorized Officer Myung Jin Lee, International Search Report, International Application No. PCT/US2016/024558, dated Jun. 27, 2016, 7 pages.

* cited by examiner

NOTIFICATION MANAGEMENT SYSTEMS AND METHODS FOR MONITORING THE OPERATION OF A MODULAR POWER PLANT

PRIORITY CLAIM

This patent application claims the priority of U.S. Provisional Patent Application Ser. No. 62/205,084, entitled SYSTEMS AND METHODS FOR THE MANAGEMENT OF OPERATOR NOTIFICATIONS AND POST-SHUTDOWN DISPLAYS FOR MODULAR FUSION-BASED POWER PLANTS, filed on Aug. 14, 2015, the contents of which are hereby incorporated by reference.

FIELD OF THE INVENTION

The application relates to a power-generation module and, more particularly but not exclusively to, managing and providing notification to the operators and other personnel of a power plant.

BACKGROUND OF THE INVENTION

During the operation of a power plant that includes a fusion reactor, various conditions and statuses of the power plant must be continuously monitored. Furthermore, information regarding the monitoring of the power plant must be presented to the reactor operator and other plant personnel in a manner that clearly conveys the criticality of the information without overwhelming the personnel.

Monitoring the operation of a power plant requires the simultaneous and continuous monitoring of a large number of parameters regarding the fusion reactor. Furthermore, various common systems of the power plant must also be simultaneously and continuously monitored. Such monitoring requires a significant diligence from the reactor's operator. The demand for such operator diligence grows as the number of reactors included in a power plant multiplies. It is for these and other concerns that the following disclosure is provided.

SUMMARY OF THE INVENTION

Various embodiments are directed towards systems for managing notifications for modular power plants. The power plant may include one or more power-generation module (PGM) assemblies and/or one or more common-systems (CS). The system may include at least one of a transceiver, a display device, a memory, and/or a processor device. The transceiver receives data over a network. The display device displays a graphical display. The memory stores at least instructions. The processor device executes instructions that perform actions.

In various embodiments, the actions include receiving power plant data over the network, detecting an event, in response to the event, determining a notification type, providing a notification to a user via the graphical display, and enabling the user to acknowledge the notification. The power plant data includes signals generated by one or more sensors. The sensors may be included in at least one of the PGM assemblies or one of the CS. The event may be based on the power plant data and one or more notification thresholds. The notification type is based on the data and the one or more notification thresholds. The notification may be based on the notification type and the event.

In at least one embodiment, the actions further include selecting an icon, incrementing an unacknowledged events counter associated with the icon, and incrementing a total events counter associated with the icon. The icon may be included in the graphical display. Furthermore, the icon may be based on the notification type.

In some embodiments, the actions further include, in response to the user acknowledging the notification, decrementing an unacknowledged events counter and updating at least one of a behavior or a color of the icon. Decrementing the unacknowledged events counter may be based on an icon associated with the notification type.

In various embodiments, the actions further include, in response to a clearing of the event, decrementing a total events counter and updating at least one of a behavior or a color of the icon. Decrementing the total events counter may be based on an icon associated with the notification type.

The actions may further include selecting a traffic light included in the graphical display and updating an icon included in the traffic light. Selecting the traffic light may be based at least one of the PGM assemblies or one of the CS that is associated with the event. Updating the icon may be based on the notification type. Providing the notification may include providing an audible indication based on the notification type. In at least one embodiment, the actions further include automatically logging the notification in a database.

Some embodiments are directed to a method for managing notifications for a modular power plant. The method includes detecting an event, in response to the event determining a notification type, providing a notification to a user, and logging the notification in a database. Detecting the event may be based on at least one of power plant data and/or one or more notification thresholds. In some embodiments, the power plant data is received over a network. The power plant data includes signals generated by one or more sensors. The sensors may be included in at least one of the PGM assembly or one of the CS included in the power plant.

Determining the notification type is based on the power plant data and one or more notification thresholds. In some embodiments, providing the notification includes selecting an icon, incrementing at least one of an unacknowledged events counter, and updating at least one of a behavior or a color of the icon based on the event. The icon is included in a graphical display. Selecting the icon may be based on the notification type. The unacknowledged events counter is associated with at least one of the icon or a total events counter associated with the icon.

In some embodiments, determining the notification type may include determining a plant notification system (PNS) threshold included in the plurality of thresholds and determining the notification type. A value in the power plant data may be greater than the PNS threshold. Determining the notification type may be based on a comparison between the value in the power plant data and the PNS threshold.

In some embodiments, the method further includes determining an event priority for the event and providing the notification to the user based on the event priority. Determining the event priority may be based on an immediacy of a required user action associated with the event. The event priority may be further based on a plurality of immediacies of required user actions associated with a plurality of other detected events.

In some embodiments, the notification type is determined among a plurality of notification types. The plurality of notification types may include at least a first notification type and a second notification type. The plurality of notification types are arranged in a tiered hierarchy. In the tiered hierarchy, the first notification type is above the seconded notification type. Providing the notification to the user may further include when the notification type is the first notification type, providing a constant audible indication to the user. When the notification type is the second notification type, a short single audible indication is provided to the user.

In some embodiments, the method further includes enabling the user to customize the notification. The user may provide at least a portion of the plurality of PNS thresholds. The method may further include updating another icon included in the graphical display. Updating the icon may be based on a current status of a component included in the one or more PGM assemblies or the one or more CS. The other icon may be associated with the component. The updated other icon includes a status indicator indicating the current status of the component.

In at least one embodiment, updating the behavior of the icon includes transitioning the icon from a solid icon to a flashing icon. The method may further include providing another notification to the user when a condition associated with the event persists for a predetermined time. The other notification to the user may be based on another notification type. The other notification type is associated with a higher ranking in a tiered hierarchy of notification types than the notification type.

Some embodiments are directed to a system for managing notifications for a modular power plant. The system may include a heat-generating assembly, a sensor, a display device, a database, and a processor device. The sensor generates data based on an operation of the heat-generating assembly. The display device displays a graphical display. The database stores data generated by the sensor and notifications. The processor device executes instructions that perform actions.

In various embodiments, the actions include detecting an event, in response to the event, determining a notification type, providing a notification to a user via the graphical display, and automatically logging the notification in the database. Detecting the event may be based on at least a portion of the data generated by the sensor and one or more corresponding notification thresholds. Determining a notification type may be based on the portion of the data and the one or more corresponding notification thresholds. Providing the notification may be based on the notification type and the event.

In at least one embodiment, the actions further include providing one or more protocols. The protocols may include one or more required user actions in response to the event. The actions further include selecting an icon that is included in the graphical display and transitioning a color of the icon from white to either yellow or red based on the notification type. Selecting the icon may be display based on the notification type.

In some embodiments, the actions further includes enabling the user to acknowledge the notification and transitioning a behavior of the icon from flashing to solid, in response to the user acknowledging the notification. In at least one embodiment, the actions further include providing a plurality of notifications to the user. Providing the plurality of notifications may be based on at least one of a filtering or a dynamic priority ranking of the plurality of notifications.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Figure 1A:
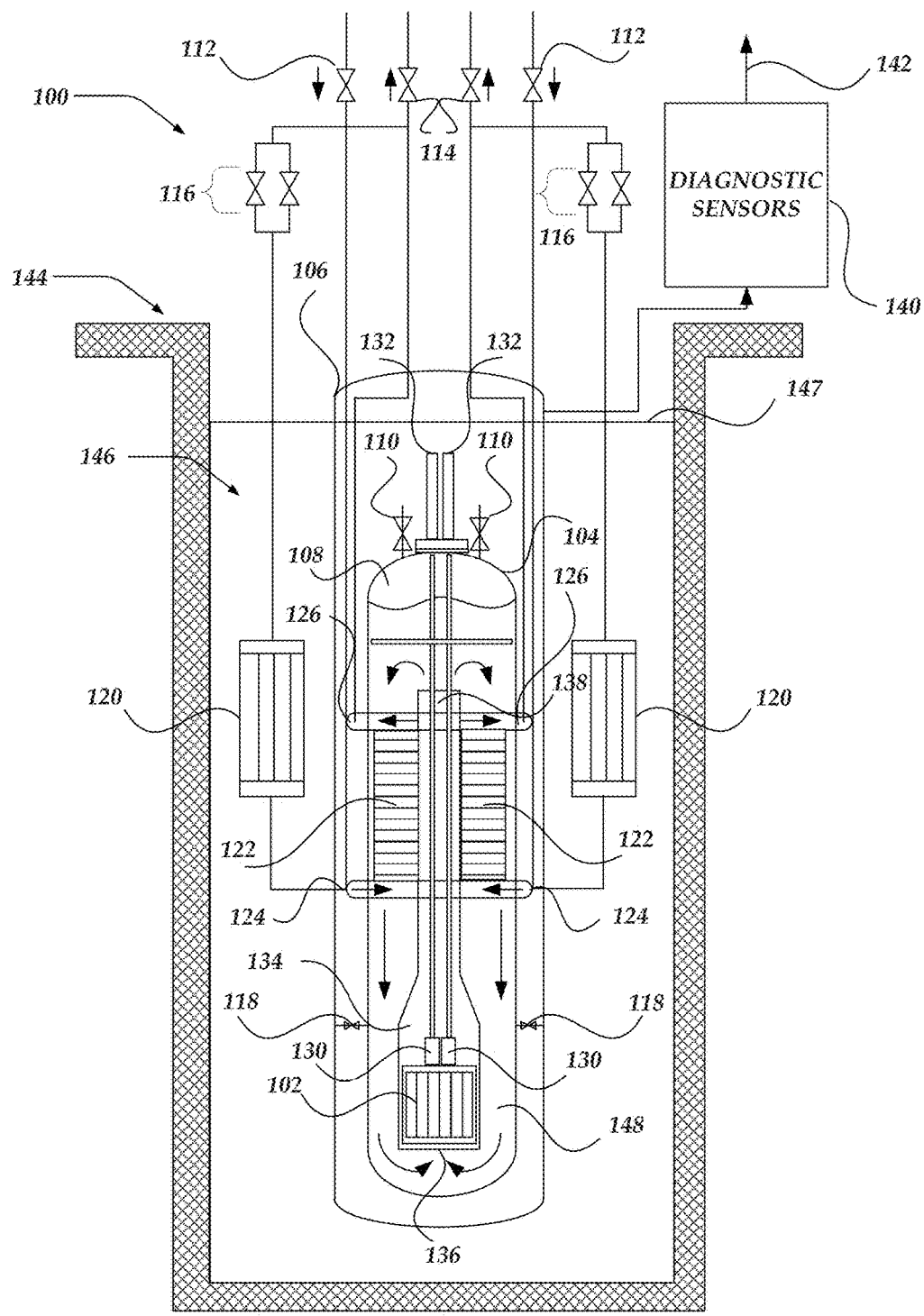
FIG. 1A provides a schematic view of a power-generation module assembly that is consistent with the various embodiments disclosed herein.

Various embodiments are described more fully hereinafter with reference to the accompanying drawings, which form a part hereof, and which show, by way of illustration, specific embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media, or devices. Accordingly, the various embodiments may be entirely hardware embodiments, entirely software embodiments, or embodiments combining software and hardware aspects. The following detailed description should, therefore, not be limiting.

Throughout the specification and claims, the following terms take the meanings explicitly associated herein, unless the context clearly dictates otherwise. The term "herein" refers to the specification, claims, and drawings associated with the current application. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

Briefly stated, embodiments are directed to configuring, providing, and managing notifications to one or more operators or personnel of a power plant. The power plant may be a modular power plant that includes one or more power-generation module (PGM) assemblies. In some embodiments, the PGM assemblies may include a nuclear reactor that has a reactor core that generates at least one of heat, pressure, or radioactivity. The PGM assembly may be included in a PGM assembly array included in a modular power plant, such as a modular nuclear power plant.

The notifications are in regards to the real-time, or near real-time, status or condition of the operation of the power plant. The notifications aid the operators and/or plant personnel in understanding the current status of the plant operation and promote plant safety, while minimizing information duplication, noise, confusion, and information overload for the operators.

The plant may include a human systems interface (HSI). In various embodiments, the HSI may include a plant notification system (PNS). The PNS includes one or more user interfaces (UIs). The operators and/or plant personnel may be users of the PNS. The one or more UIs may be provided to a user via one or more display devices included in the PNS. At least a portion of the notifications may be provided via icons included in notification traffic lights displayed via the UIs.

In at least one embodiment, at least four (4) UIs are displayed on four separate display devices. The four UIs include at least a plant overview UI, and three other UIs. Each of the four UIs include a header bar, wherein the header bars include one or more traffic lights. For instance, UI 650 of FIG. 6B includes header bar 652 that includes a first traffic light 660 and a second traffic light 670. A traffic light may include one or more icons to provide the notifications.

Various types of notifications may be provided to a user. The notification types may be included or otherwise arranged in a tiered hierarchy based on the criticality of the plant conditions that triggered the notification. By arranging the notifications types in the tiered hierarchy, the information provided to the user via the notification may be sorted, filtered, and prioritized (ranked). Such notification types may include, but are not otherwise limited to, an alarm, a warning, a notice, a status indicator, and an event. Once a notification has been acknowledged by a user, the notification type of the notification may include acknowledged. For instance, after the user acknowledges an alarm notification, the notification type of the notification may be an acknowledged alarm. Similarly, once a notification has been cleared by a user, the notification type of the notification may include a cleared notification. Accordingly, once cleared, a warning notification may be a cleared warning notification.

PNS thresholds are utilized to determine the conditions of the operation of the plant that triggered the various notification types. Accordingly, PNS thresholds may include upper and/or lower alarm thresholds, warning thresholds, and notice thresholds. Each of the thresholds may be a threshold, or setpoint, for a PGM assembly parameter, or a common-system (CS) parameter, wherein the PGM assembly parameters and CS parameters are being actively monitored by the PNS.

In various embodiments, alarms are the highest in the tiered hierarchy of notification types and take precedence over other notification types, such as warnings and notices. An alarm may be a notification type that indicates that an operating condition of the plant has exceeded, or fell below, an alarm threshold.

An alarm notification may indicate that the user is required to take immediate action. Various alarms may differ in severity and include a variety of consequences, including a shutdown event of at least one of the PGM assemblies included in the power plant. When multiple alarms are triggered via one or more PGM or CS parameters exceeding (or falling below) an alarm thresholds, various embodiments of the PNS prioritize the alarms in a ranking based on the order in which the corresponding triggering conditions must be addressed by the user and/or the severity of the conditions. In addition to various visual indications clearly displayed via one or more UI's, alarm notifications may include audible indications. For instance, in at least one embodiment, when an alarm condition is triggered, the color of the alarm icon may transition from white to red, the behavior of the alarm icon may transition from solid to flashing, and a constant audible indication, such as a siren, may be provided to the user.

In various embodiments, a warning may be the second tiered notification type in the tiered hierarchy of notifications types. A warning may be a notification type that indicates that an operating condition of the plant has exceeded, or fell below, a warning threshold. A warning notification may be provided to increase the user's attention and notify the user that a condition exists that needs to be eventually resolved. However, in at least one embodiment, a warning does not indicate that immediate action is required by the user.

A warning may be a notification type that indicates that the PNS has identified a trend in one or more operating conditions of the power plant that, if it persists for at least a predetermined period of time, may develop into an operating condition that triggers an alarm. For instance, a corresponding notice type notification may have been previously provided, but the corresponding triggering condition has not been resolved or the severity of the condition has continued to increase.

User action may not be required for a waring type notification. However, warnings may indicate that the user should monitor the progress of the condition that triggered the warning to ensure that the condition stabilizes. In addition to visual indications, such as animations of icons, low-level audible indications may be included in a warning type notification. For instance, a warning icon may be colored yellow and be flashing or pulsing to provide a warning notification. A short single audible identification may be provided in various embodiments.

In some embodiments, a notice type notification may be the third tiered notification in the tiered hierarchy of notifications. A notice may be a notification type that indicates that an operating condition of the plant has exceeded, or fell below, a notice threshold. At least some notices may be manually provided to the user.

A notice may be a notification type that indicates a condition occurring during the normal operation of the plant. No user action may be required. A notice may indicate a percentage of a process completed, or the like. Notices may be used to increase the user's situational awareness for an important event or a relatively rare event. For instance, a notice may be provided when a containment evacuation system of a PGM assembly is turning on. Other such events that may trigger a notice include, but are not limited to dilutions, borations, or equipment tagouts. Notices may include non-invasive indications on notice icons, messages, or the like.

A status indicator may be a notification type that provides continuous visual indication to a user to increase situational awareness about the status of a module, individual system, or component without needing to navigate to the event log. An example of a status indicator would be a lasso box around a tagged out component currently undergoing maintenance, or a component that is not currently powered.

An event indicator may be a notification type that is used to categorize plant conditions and actions. Event type notifications may include but are not limited to component tag outs and the starting of an automated process. Event notifications may be accessible via a UI provided by the PNS. Users may utilize this UI to sort the event notifications by various means such as module number, system name, components, etc.

Figure 6A:
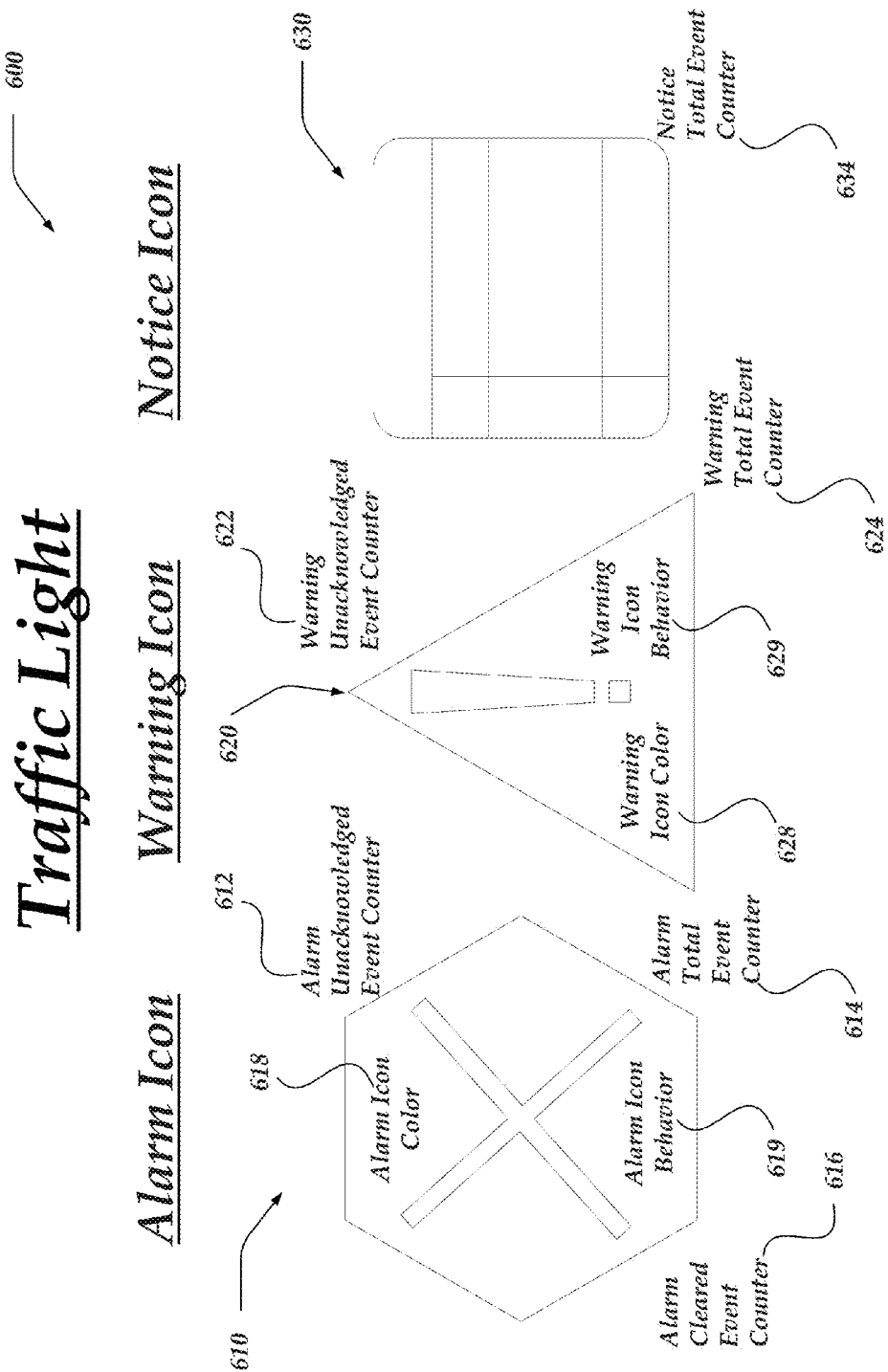
FIG. 6A shows a traffic light included in a plant notification system that provides notifications to users and is in accordance with at least one of the various embodiments.

As noted throughout, a notification may include visual and/or audible information, such as indicators. The notifications may be at least partially provided via icons included in the "traffic lights." For instance, the non-limiting exemplary embodiment of a traffic light 600 in FIG. 6A includes an alarm icon 610, a warning icon 620, and a notice icon 630. At least one of the location, behavior, or color of an icon may be employed to provide indicators in the notification. As shown in FIG. 6A, one or more counters may also be used to provide indicators in the notifications. Furthermore, various audible alarms may be employed as an indicator in the notification. The sound (tone), length, and behavior (for example, continuous or pulsed) of the audible alarm may be used to provide one or more indications of the condition that triggered the notification. Each of the provided notifications may be automatically logged in a database.

One or more UIs included in the HIS may streamline and/or simplify the process of monitoring critical and/or non-critical PGM parameters, as well as parameters associated with systems that are common to the PGM assemblies (CS parameters). Each UI may correspond to a specific PGM assembly included in the PGM assembly array. In various embodiments, each UI may be automatically provided on a specific display device that corresponds to the specific PGM assembly.

In some embodiments, the UIs may display in real-time, or near real-time, indicators corresponding to one or more PGM and CS parameters. The UIs may provide indications of whether the one or more post-shutdown PGM parameters meet post-shutdown criteria. The post-shutdown criteria may include safety and/or asset protection criteria. Furthermore, one or more PGM parameter thresholds may be based on the post-shutdown criteria.

Illustrated Operating Environment

FIG. 1A provides a schematic view of a power-generation module (PGM) assembly 100 that is consistent with the various embodiments disclosed herein. In some embodiments, PGM assembly 100 is a modular nuclear reactor assembly, although other embodiments are not so constrained and PGM assembly 100 may be any modular assembly that generates flowing energy (heat). In at least one embodiment, PGM assembly 100 is a modular fusion reactor assembly.

PGM assembly 100 may be housed in a PGM bay 144. The PGM bay 144 may include a cooling pool 146 of water or some other material that includes thermal properties enabling the cooling of PGM assembly 100. At least a portion of the PGM assembly 100 may be submerged in the cooling pool 146. Accordingly, at least a portion of the PGM assembly 100 may be below the top of a water line 147 of the cooling pool.

PGM assembly 100 includes PGM core 102. PGM core 102 may be any device, assembly, apparatus, or configuration that is employed to controllably generate heat. Thus, PGM assembly 100 may be an embodiment of a heat generating assembly. In some embodiments, PGM core 102 may be a nuclear reactor core, such as but not limited to a fusion reactor core. PGM core 102 may be immersed in PGM coolant 148. In at least one embodiment, PGM coolant 148 includes water or any other material that enables the flow of heat (generated by the PGM core 102) away from the PGM core 102.

In some embodiments, PGM assembly 100 includes a core shroud 134 that guides the flow of PGM coolant 148 upwards through the PGM core 102 as shown in FIG. 1A. The PGM core 102, the core shroud 134, and the PGM coolant 148 are housed within a pressure vessel 104.

In various embodiments, PGM core 102 generates heat that is transferred to the PGM coolant 148. As shown by the flow arrows in FIG. 1A, heating the PGM coolant 148 in the pressure vessel 104 generates a generally vertical circular convection flow of the PGM coolant 148. The core shroud 134 generally guides the vertical circular convection flow of the PGM coolant 148. A pressurizer 108 may regulate the internal pressure within pressure vessel 104 that is due to at least the heating and/or the convection flow of the PGM coolant 148.

The PGM core 102 heats the portion of the PGM coolant 148 that is in the lower plenum 136 of the core shroud 134. The heated PGM coolant 148 flows upward and out of the shroud riser 138. As the heated PGM coolant 148 flows up and over the shroud riser 138, the heated PGM coolant 148 provides heat to a plurality of steam generators 122. Due to at least this heat exchange the PGM coolant 148 is cooled. As shown by the flow arrows in FIG. 1A, once outside of the shroud riser 138, the PGM coolant 148 flows generally downward between the core shroud 134 and the pressure vessel 104. The convection current pulls the cooled PGM coolant 148 near the lower plenum 136 back into the core shroud 134. The PGM core 102 reheats the PGM coolant 148 such that the convection current continues to circulate and cool the PGM core 102.

The pressure vessel 104 may be housed within a containment vessel 106. The containment vessel 106 may insure the containment of material within the pressure vessel 104, including any material included in the PGM core 102, as well as the PGM coolant 148. In some embodiments, the PGM assembly 100 includes a plurality of PGM vent valves 110 and/or a plurality of PGM recirculation valves 118 to vent pressure within and/or dissipate excess heat away from the pressure vessel 104.

Feedwater may flow in a circuit that includes the steam generators 122 and electrical generators (not shown in FIG. 1A). Within the steam generators 122, the feedwater is heated to generate steam. The generated steam flows out of the steam headers 126 and carries the transferred heat away from PGM assembly 100. A plurality of steam isolation valves 114 regulate the flow of the steam away from the PGM assembly 100. The steam may be routed via a steam bus, such as but not limited to steam bus 160 of FIG. 1B, to a plurality of electrical generators, such as but not limited to turbine generator 176 of FIG. 1B, to generate electrical power or some other form of usable power.

After the energy within the steam generates the electrical power, the return of the cooled feedwater to the PGM assembly 100 may be regulated via a plurality of feedwater isolation valves 112. The cooled feedwater is returned to the steam generators 122 via the feedwater headers 124, to complete the circuit.

In at least some embodiments, even after a shutdown of the PGM assembly 100, the PGM core 102 may continue to generate heat. The heat that is generated after a shutdown of the PGM assembly 100 may be decay heat. For instance, in embodiments where the PGM core 102 includes a nuclear reactor core, the nuclear reactor core may continue to generate heat during a decay period associated with the spent fuel within the nuclear reactor core. Accordingly, to ensure that the PGM core 102 and other components of the PGM assembly 100 do not overheat, at least due to decay heat, the power generated by the PGM core 102 may be dissipated.

To dissipate decay heat in some embodiments, the PGM assembly 100 includes a decay heat removal system (DHRS). The DHRS may include a plurality of DHRS heat exchangers 120 submerged in the cooling pool 146 of the PGM bay 144, as well as a plurality of a plurality of DHRS valves 116 to divert the flow of the feedwater/steam away from the steam bus.

During a shutdown of the PGM assembly 100, or during another event where it is desired to not provide the steam and/or heated feedwater to the electrical generators, the plurality of steam isolation valves 114 may be closed such that the steam and/or heated feedwater does not flow to the electrical generators. Rather, the steam and/or heated feedwater flows through the plurality of DHRS heat exchangers 120 and is cooled. The DHRS heat exchangers 120 dump the excess heat into cooling pool 146. The circular flow of feedwater through the decay heat exchangers 120 may be regulated by the plurality of DHRS valves 116.

The rate of power generation of the of the PGM core 102 may be regulated by the positioning of one or more control rods 130. The positioning of the one or more control rods 130 may be driven by control rod drives 132.

PGM assembly 100 includes a plurality of diagnostic sensors 140 schematically shown in FIG. 1A. Diagnostic sensors 140 may sense and/or generate sensor data to monitor various components of PGM module 100. Diagnostic sensors 140 may include various types of sensors, such as but not limited to temperature sensors, pressure sensors, valve position sensors, control rod positioning sensors, radioactivity sensors, fluid and gas flow sensors, or any other sensor that monitors parameters of the PGM assembly 100. Diagnostic sensors 140 provide sensor output signals on a sensor data bus 142. Sensor output data may be diagnostic sensor data, or simply sensor data. Diagnostic sensors 140 may include safety sensors or safety-related sensors, as well as asset protection-related sensors.

Figure 1B:
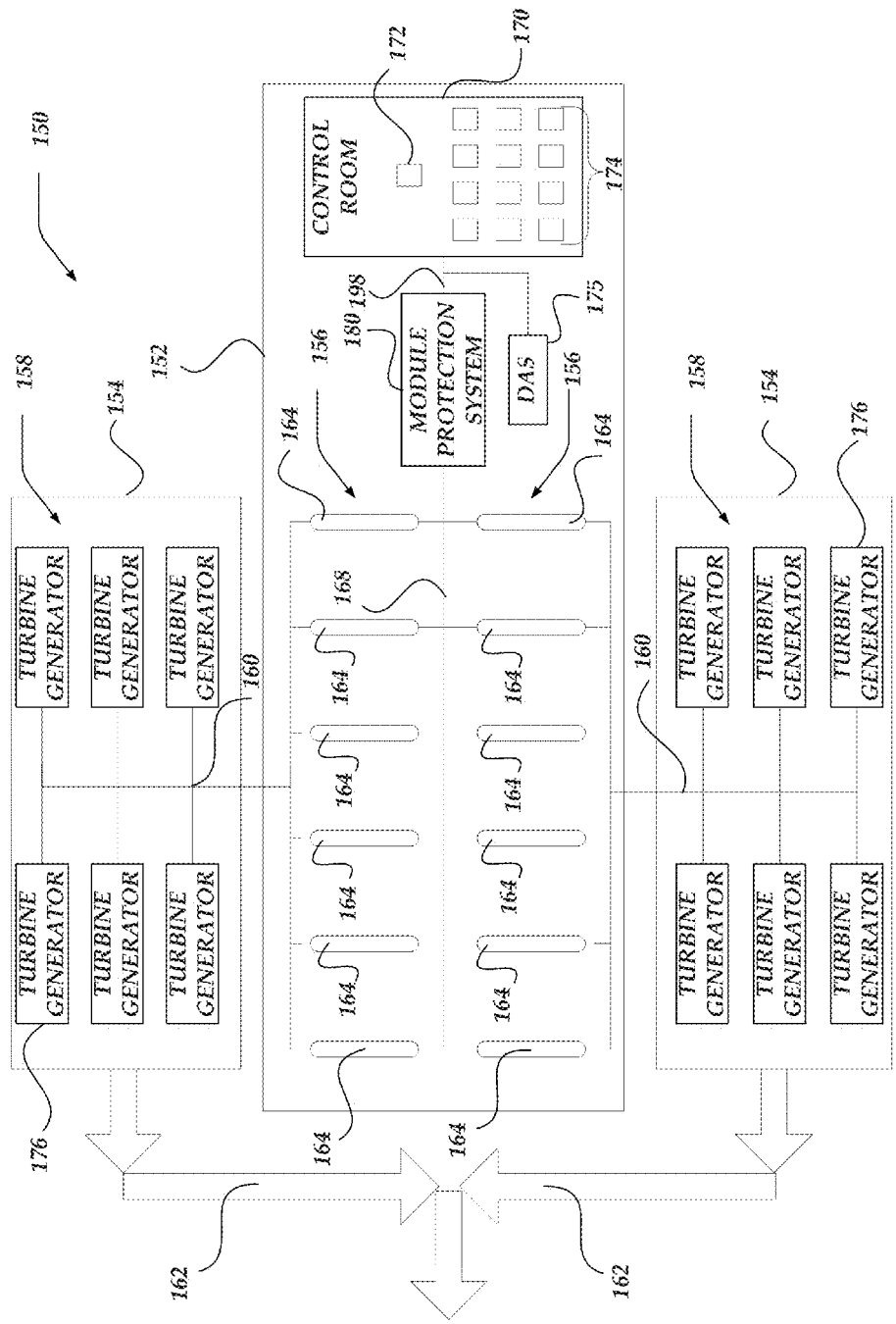
FIG. 1B provides a schematic view of a modular power plant that is consistent with the various embodiments disclosed herein.

FIG. 1B provides a schematic view of a modular power plant 150 that is consistent with the various embodiments disclosed herein. Modular power plant 150 includes power-generation module (PGM) assembly array 156. PGM assembly array 156 includes one or more PGM assemblies, such as but not limited to PGM assembly 164. In some embodiments, at least one of the PGM assemblies included in PGM assembly array 156 may include similar features to PGM assembly 100 of FIG. 1A. As shown in FIG. 1B, in at least one embodiment, PGM assembly array 156 includes twelve PGM assemblies. However, in other embodiments, the number of PGM assemblies included in PGM assembly array 156 includes more or less than twelve PGM assemblies. A PGM housing 152 may house at least a portion of the PGM assembly array 156.

In some embodiments, one or more generator housings 154 house a generator array 158. Generator array 158 includes one or more devices that generate electrical power or some other form of usable power from steam generated by the PGM assembly array 156. Accordingly, generator array 158 may include one or more electrical generators, such as but not limited to turbine generator 176. As shown in FIG. 1B, in at least one embodiment, generator array 158 includes twelve electrical generators. However, in other embodiments, the number of electrical generators included in generator array 158 includes more or less than electrical generators. In at least one embodiment, there is a one to one correspondence between each PGM assembly included PGM assembly array 156 and each electrical generator included in generator array 158.

A steam bus 160 may route the steam generated by PGM assembly array 156 to the generator array 158. The steam bus 160 may provide the one to one correspondence between the PGM assemblies included in the PGM assembly array 156 and the electrical generators included in the generator array 158. For instance, the steam bus 160 may insure that the steam generated by a particular PGM assembly is provided only to a particular electrical generator. The steam bus 160 may additionally insure that the steam provided to the particular electrical generator is generated only by the particular PGM assembly. A power bus 162 may transmit the electrical power generated by modular power plant 150 to other structures.

Modular power plant 150 may include a sensor data bus 168, a module protection system (MPS) 180, a module control system (MCS) network 198, a data acquisition system (DAS) 175, and a control room 170. As shown in FIG. 1B, in at least some embodiments, the MPS 180 and the control room 170 are housed within PGM housing 152, although other embodiments are not so constrained.

Figure 1C:
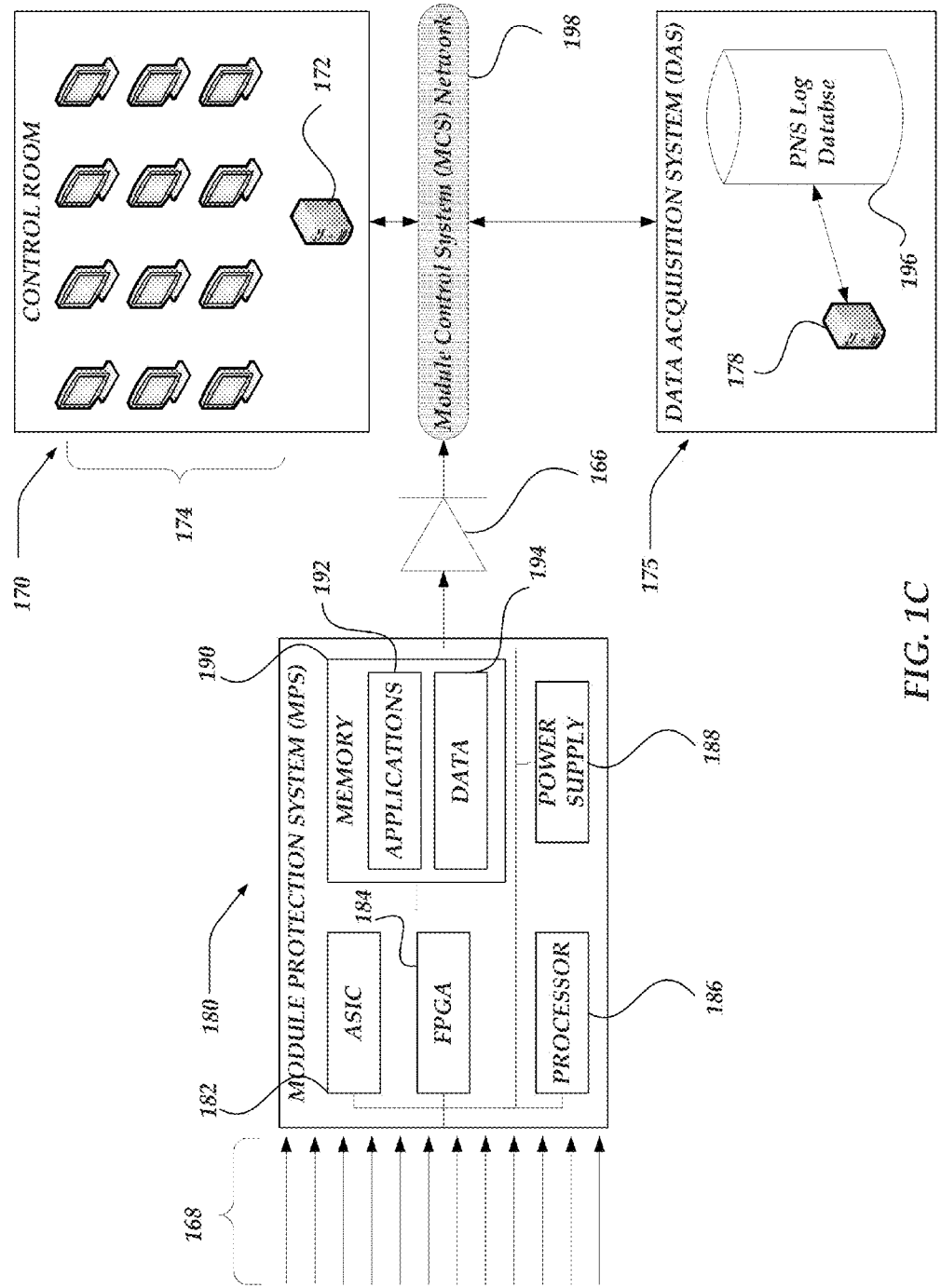
FIG. 1C provides a schematic view of sensor data bus, the modular protection system, the module control system network, the data acquisition system, and the control room of FIG. 1B.

FIG. 1C provides a schematic view of sensor data bus 168, the MPS 180, the MCS network 198, the DAS 175, and the control room 170 of FIG. 1B. The sensor data bus 168 may provide data generated by diagnostic sensors included in each PGM assembly include PGM assembly array 156 of FIG. 1B, such as but not limited to diagnostic sensors 140 of FIG. 1A, to MPS 180. As shown in FIG. 1C, in various embodiments, the sensor data bus 168 may provide at least one input, corresponding to each of the PGM assemblies included in PGM assembly array 156, to the MPS 180.

MPS 180 provides at least a portion of the diagnostic sensor data to control room 170 via a module control system (MCS) network 198 and the data acquisition system (DAS) 175. Accordingly, MPS 180 may be a modular protection data hub. MPS 180 provides protection for the integrity of the diagnostic sensor data. MPS 180 may receive sensor data from diagnostic sensors included in a PGM assembly.

In various embodiments, MPS 180 includes at least one of a processor 186, logic circuitry, such as but not limited to application specific integrated circuits (ASIC) 182 and/or field programmable gate arrays (FPGA) 184, and a power supply 188. The various logic circuitry may include similar features to logic circuitry 268 discussed in conjunction with at least FIG. 2. Processor 186 that may include similar features to processor 202 and power supply 188 may include similar feature to power supply 230 discussed in at least conjunction with FIG. 2.

MPS may further include memory 190 to store various applications 192 and data 194, such as but not limited to the diagnostic sensor data provided by the sensor data bus 168. Memory 190 may include similar features to memory 204 discussed in conjunction with at least FIG. 2.

Control room 170 includes at least one device 172 and a display device array 174. Device 172 may be similar to, or at least include similar features to computer device 200 discussed in conjunction with at least FIG. 2. Accordingly, in some embodiments, device 172 is a computer device. Device 172 may be a specialized hardware device that includes one or more components included in computer device 200, such as but not limited to a processor device, an application-specific integrated circuit (ASIC), or field programmable gate array (FPGA). Device 172 may be PNS monitoring device. Display device array 174 includes one or more display devices. At least one of the display devices included in display device array 174 may be similar to, or at least include similar features to display 250 discussed in conjunction with at least FIG. 2. At least one of the display devices included in display device array 174 may display a user interface (UI), such as a graphical display. For instance, any of the user interfaces discussed herein, including but not limited to UI 650 of FIG. 6B, may be a graphical display.

As shown in FIG. 1B, in some embodiments, the display device array 174 includes twelve display devices. In at least one embodiment, there is a one to one correspondence between each of the PGM assemblies included in the PGM assembly array 156 and each of the display devices included in display device array 174. Accordingly, there may be more or less than twelve display devices included in display device 174.

A data diode 166 may protect the MPS 180 by enabling data to flow from the MPS 180 to the MCS 198, but prevent data flowing from MCS network 198 to MPS 180. Accordingly, one or more data busses upstream of data diode 166 may be protected from data signals from downstream of data diode 166, such as signals from MCS network 198. In some embodiments, data busses upstream of data diode 166 may include transport data that is critical to the safe operation of modular power plant 150, but at least a portion of the data transported by MCS network 198 is not critical to the safe operation of modular power plant 150.

DAS 175 includes may include a computer device 178 and a plant notification system (PNS) log database 196. Each of the PNS events and any of the associated notifications may be automatically logged in the PNS log database 196.

Generalized Operations

The operation of certain aspects of the invention will now be described with respect to FIGS. 3-5D. In at least one of various embodiments, processes 300, 400, 500, 520, 540, and 560 described in conjunction with FIGS. 3-5D, respectively, or portions of these processes may be implemented by and/or executed on a computer device, such as but not limited to computer device 200 of FIG. 2. In other embodiments, these processes or portions of these processes may be implemented by and/or executed on a plurality of computer devices. Further, in other embodiments, these processes or portions of these processes may be implemented by and/or executed on one or more module protection systems (MPSs), such as MPS 180 as shown in FIG. 1C. In addition, in at least one of the various embodiments, these processes or portions of these processes may be implemented by and/or executed on one or more cloud instances operating in one or more cloud networks. However, embodiments are not so limited and various combinations of computer devices, MPSs, cloud computers, or other structures, may be utilized.

Figure 6B:
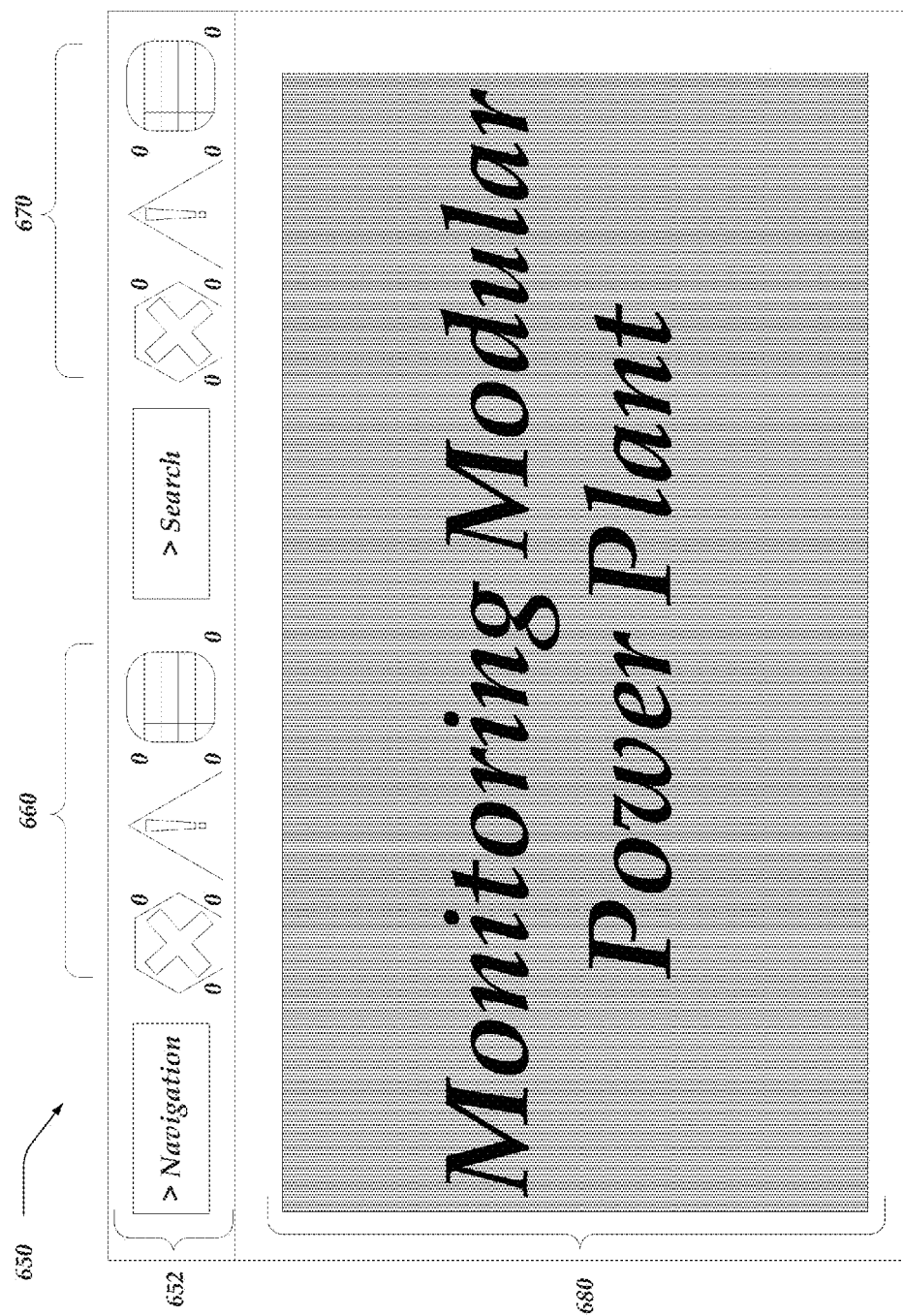
FIG. 6B shows a user interface employed to monitor the operation of a power plant and provide notifications to users in accordance with at least one of the various embodiments, where the user interface includes two instances of traffic lights.
Figure 7A:
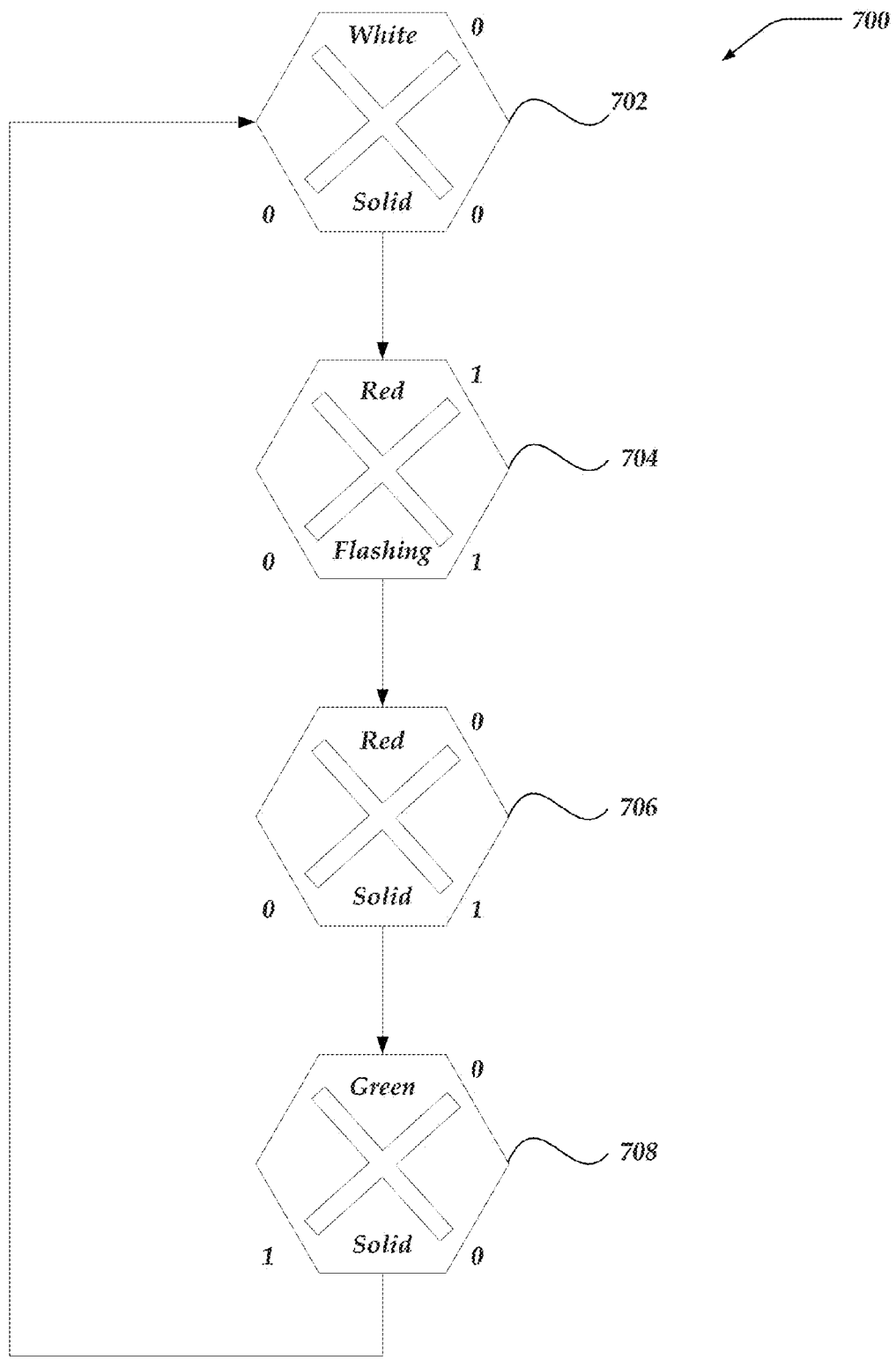
FIG. 7A shows a state diagram for the states of an alarm icon included in the traffic light of FIG. 6A.
Figure 7B:
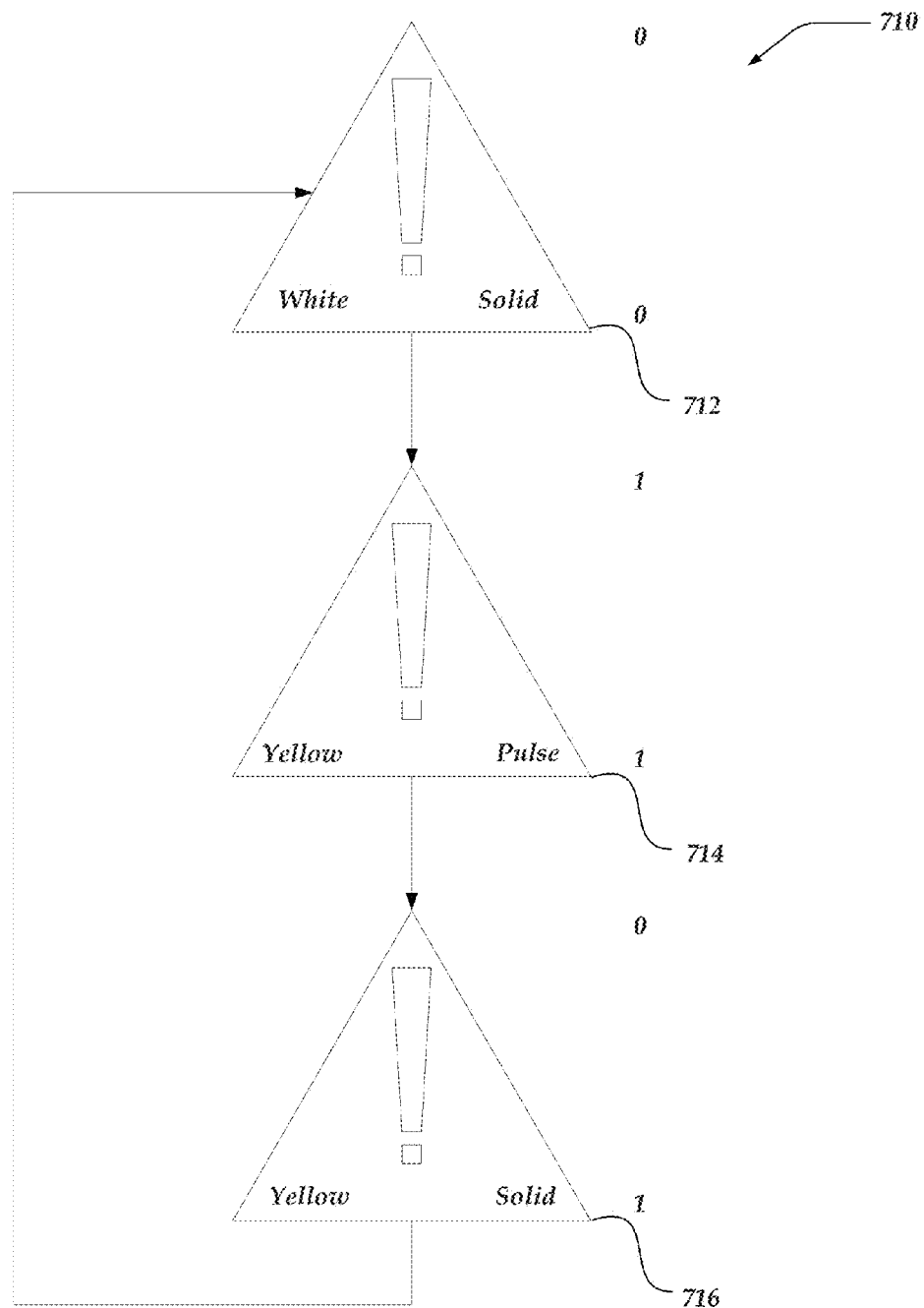
FIG. 7B shows a state diagram for the states of a warning icon included in the traffic light of FIG. 6A.

The discussion in conjunction with processes 300, 400, 500, 520, 540, and 560 additionally refers to traffic light 600 of FIG. 6A, user interface (UI) 650 of FIG. 6B, and state diagrams 700 and 710 of FIGS. 7A-7B. FIG. 6A shows a traffic light 600 included in a plant notification system (PNS) that is included in a human-systems interface (HSI) of a power plant, such as but not limited to modular power plant 150 of FIG. 1B. The PNS provides notifications to users, in regards to the operation of the power plant.

FIG. 6B shows a user interface (UI) 650 employed to monitor the operation of the power plant. UI 650 includes a header bar 652 that includes a first traffic light 660 and a second traffic light 670 to provide notifications to users, such as plant operators and other power plant personnel. As discussed herein, UI 650 is employed in conjunction with the operation of a power plant, such as but not limited to modular power plant 150 of FIG. 1B. In some embodiments, a separate UI, such as but not limited to UI 650, is employed to monitor at least a portion of PGM parameters associated with each of the PGM assemblies, such as but not limited PGM assembly 100 of FIG. 1A or PGM assembly 164 of FIG. 1B, included in a PGM assembly array, such as but not limited to PGM assembly array 156 of modular power plant 150, after the PGM assembly has been shut down. In such embodiments, a separate UI for each PGM assembly may be provided to a separate display device included in a display device array, such as but not limited to display device array 174 of modular power plant 150, included in a control room, such as but not limited to control room 170 of modular power plant 150.

FIG. 7A shows a state diagram for the states of an alarm icon included in the traffic light of FIG. 6A. FIG. 7B shows a state diagram for the states of a warning icon included in the traffic light of FIG. 6A.

In various embodiments, a PNS tracks at least a portion of the notifications and user interactions with the notifications, such as user acknowledgments of the notifications. For instance the notifications and user interactions may be automatically logged and archived via a data acquisition system (DAS), such as DAS 175 of FIG. 1C. Such tracking may aid users in ensuring that the notification types that need immediate attention are acted on as well as automatically logging all PNS events for future tracking purposes.

Various embodiments of a PNS include a snooze or shelving feature. This feature may aid users in addressing notifications that require user action outside of the control room of the power plant. If a user assigns an equipment operator (plant operator) to investigate an alarm, a PNS may aid the operator in ensuring that the response is timely by providing a reminder if the condition triggering the notification is not cleared or otherwise resolved within a predetermined period of time.

In various embodiments, the PNS enables the managing and tracking of various timers. Each of the timers may include one or more periods of time, which may be predetermined. The PNS may enable tracking and notifying the operating crew of the required user actions. For instance, time limits may be associated with communication requirements in a power plant emergency plan. A PNS may track and communicate these time limits. In some embodiments, there may be equipment limitations. Such equipment limitations may be tracked and communicated to the user via PNS generated notifications, including but not limited to notice type notifications.

As discussed throughout, at least a portion of the PNS generated notifications and/or plant data corresponding to the events that triggered the notifications (PNS events) may be automatically logged via a data acquisition system (DAS). A PNS event may be a change or a variation in the operation of the plant, such as but not limited to a PNS generated notification, a tagged out component, the start of an automatic process, and important (PGM or CS) parameters. The HSI may be enabled to sort the PNS events in any configuration. Examples of PNS event sorting include sorting by module or system for evaluation of a plant concern or status, research of a past issue or just to print out logged plant data. A UI may be provided to navigate and retrieve the desired information.

Some PNS events may have indicators associated with them. Such indicators provide additional situational awareness in a non-intrusive manner. Some embodiments of indicators may provide the user with information regarding the plant or component conditions such as valve position (open/closed) or pump status (on/off) or reference indicators.

Various embodiments of a PNS may incorporate plant data tracking that supports the collection of PNS performance data. For instance notifications actuations times (timestamps), clearances times, the indicating value and source, operator response times, and the like may be tracked and automatically logged. This information may be used by the users to ensure that the performance of PNS is not degrading over time or impacting the ability of the users to operate the power plant.

Figure 3:
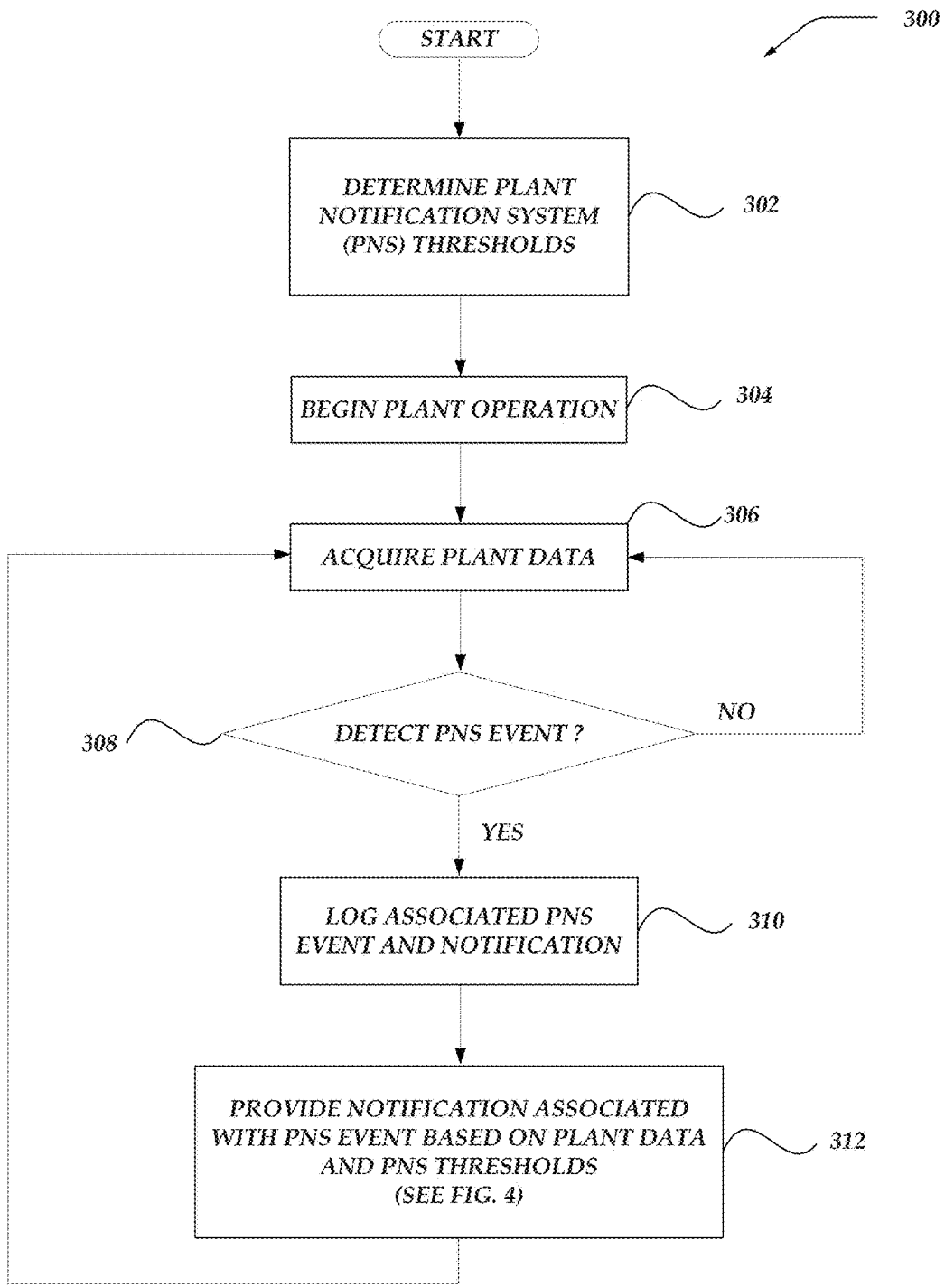
FIG. 3 shows an overview flowchart for a process to manage the plant notification system of the modular power plant of FIG. 1B that is consistent with the various embodiments.

FIG. 3 shows an overview flowchart for a process to manage a PNS of the modular power plant of FIG. 1B that is consistent with the various embodiments. After a start block, process 300 begins at block 302, where one or more PNS thresholds are determined. In various embodiments, each of the one or more PNS thresholds may correspond to one or more PGM parameters or CS parameters being monitored by the PNS. Accordingly, at least one of the PNS thresholds may be a PGM parameter threshold or a CS parameter threshold. As discussed further below, the PNS thresholds determine the ranges for monitored PGM parameters and the CS parameters for which notifications are provided to the user during the operation of a power plant.

At least one of the PGM parameter thresholds, included in the PNS thresholds, may correspond to an acceptable upper-bound of a PGM parameter being monitored. In some embodiments, at least one of the PGM parameter thresholds, included in the PNS thresholds, may correspond to an acceptable lower-bound of one or more PGM parameters being monitored. In at least one embodiment, a pair of ordered PGM parameter thresholds may correspond to an acceptable range (lower-bound and upper bound) of the one or more corresponding PGM parameters monitored during the operation of the power plant.

Similarly, at least one of the CS parameter thresholds, included in the PNS thresholds, may correspond to an acceptable upper-bound of a CS parameter being monitored. In some embodiments, at least one of the CS parameter thresholds, included in the PNS thresholds, may correspond to an acceptable lower-bound of one or more CS parameters being monitored. In at least one embodiment, a pair of ordered CS parameter thresholds may correspond to an acceptable range (lower-bound and upper bound) of the one or more corresponding CS parameters monitored during the operation of the power plant.

In some embodiments, at least one of the PGM or CS parameter thresholds may indicate an acceptable or preferred configuration, state, or value of one or more PGM or CS parameters. During operation of the plant, when one or more of the PGM or CS parameters being monitored exceed and/or fall below the corresponding PGM parameter threshold or the CS parameter threshold, the PNS provides one or more notifications to the user. As discussed throughout, the notifications may be visual and/or audible notifications. A PNS event may occur when one or more of the PGM or CS parameters being monitored exceed or fall below the corresponding PNS threshold (depending on whether the corresponding PNS is an upper or lower bound).

In various embodiments, each of the PNS thresholds may be associated with a notification type. Such notification types include, but are not otherwise limited to an alarm, a warning, and a notice. The associated notification type may correspond to the notification type provided to the user when the PGM or CS parameter corresponding the PNS threshold exceeds or falls below the PNS threshold.

One or more of the PNS thresholds may be determined via an access of a look-up table, a database query, or an access to a storage medium. For example, the PNS thresholds may be stored in PNS log database 196 of FIG. 1C.

A user may generate, supply, edit, modify, or otherwise update one or more of the PNS thresholds. For instance, the management of the power plant may modify at least a portion of the PNS thresholds. A user may set a user-defined, or customized, PNS threshold to set a customized notification in the PNS. In various embodiments, the PNS may automatically determine which notification type, if any that the use-defined PNS threshold is associated with. The PNS may automatically associate one or more PNS thresholds with the notification type. The PNS may notify the user as to which notification type the user-defined PNS threshold corresponds to.

As discussed herein, in the various embodiments, notification types may include alarms, warnings, notices, status indicators and events. Accordingly, PNS thresholds may include alarm thresholds, warning thresholds, notice thresholds, and others.

The PNS may track the generation, modification, or updating of PNS thresholds. The PNS may store or archive such tracking in a database, such as but not limited to PNS log database 196 of FIG. 1C. At least one of the PNS thresholds may be setpoint.

At block 304 of FIG. 3, the operation of the power plant may begin. The operation of the plant may include the beginning of at least one PGM assembly included in the power plant. For instance, the operation of at least one or more of the PGM assemblies included in PGM assembly array 156 of power plant 150 of FIG. 1B may begin at block 304. In at least one embodiment, a PGM core, such as but not limited to PGM core 102 of PGM assembly 100 of FIG. 1 may begin and/or continue to generate heat at block 304. For instance, control rod drives 132 may position control rods 130 outside of PGM core 102 at block 302.

At block 306 of FIG. 3, plant data is acquired. Acquiring plant data may include acquiring at least a portion of the sensor data, provided via diagnostics sensors included in the PGM assembly, such as but not limited to diagnostic sensors 140 of PGM assembly 100 of FIG. 1A. Acquiring plant data may include acquiring CS data, where CS data includes data corresponding to CS parameters. Acquiring plant data may include monitoring, in real-time or in near-real time, one or more PGM and/or CS parameters.

At decision block 308 of FIG. 3, it is determined whether a PNS event is detected. A PNS event may occur when one or more of the PGM or CS parameters, being monitored at block 306, exceed or fall below a corresponding PNS threshold (depending on whether the corresponding PNS is an upper or lower bound). Accordingly, a PNS event may be detected by monitoring, in real-time or near real-time, the acquired plant data and comparing the PGM and CS parameters with the corresponding PGM and CS parameter thresholds included in the PNS thresholds.

Accordingly, detecting a PNS event may be based on at least the monitoring the plant data acquired at block 306. In at least one embodiment, detecting a PNS event may be based on at least sensor data. If a PNS event is detected, then process 300 of FIG. 3, flows to block 310. Otherwise, process 300 flows back to block 306 to continue acquiring plant data.

At block 310, the associated PNS event and/or the notification is logged. For instance, a data acquisition system (DAS), such as DAS 175 of FIG. 1C longs the associated PNS event and the notification is a database, such as PNS database 196.

At block 312, a notification associated with the PNS event is provided to a user. The notification may be based on the plant data and one or more of the PNS thresholds. For instance, the provided notification may be based on the one or more PNS thresholds that were exceeds or fell below by the monitored PGM or CS parameter. Various embodiments of providing a notification are discussed in at least conjunction with process 400 of FIG. 4.

However briefly, at block 312, notifications are provided to the user to aid the user in understanding the current status of the operation of the plant without overloading the user with information that may distract from the user's understanding. Essentially, the notification provides the user the information that the user needs, when the user needs the information, without providing extraneous information that may distract the user from performing the user's responsibilities. Process 300 of FIG. 3, returns to block 306 to continue acquiring plant data.

The notifications may be presented at a rate such that the user may rapidly assess the location and relative importance of all corresponding conditions of the power plant. The notifications may include various notification types, such as but not limited to alarms, warnings, notices, status indicators, and events.

In various embodiments, the notifications are prioritized. Prioritizing the notifications may include determining a relative importance, to the user and/or plant safety, at least a portion of the current plant conditions associated with the triggered notifications. The criteria for determining the priority of conditions associated with alarm notifications may include the required immediacy of user action and the significance of the condition to plant safety.

Prioritizing the notifications may include selecting an order or ranking of the notifications for providing to the user based on the priority of associated plant condition. Notification types, such as alarms and warnings, may emphasize high ranking plant conditions and de-emphasize lower ranking plant conditions. Accordingly, such ranking enables focusing the user's attention on the plant condition(s) with the greatest operational significance.

To reduce the user's workload and selectively limit the amount of notifications that require user action, the notifications provided to the user may be filtered, suppressed, and/or ranked via dynamic priority ranking. In some embodiments, any combination of filtering, suppressing, and priority ranking may be employed.

The ranking or prioritization of notifications, such as alarm notifications may be based on need for user action, requirements of the plant's safety system, and others. Any number of priority levels may be included in the rankings.

Notifications may also provide instructions or protocols regarding the required user action, as well as other information. Such information may include the nature of the plant condition that triggered the notification, as well as a condition source, such as a sensor, a corresponding PNS threshold, notification causes, automatic actions, and user actions, and others.

In various embodiments, alarm type notifications may be reserved for abnormal plant conditions that require user action. Alarm type notifications may include both visual and audible indications, as well as information about the specific plant condition that triggered the alarm. In contrast, warnings, notices, status indications, and other notification types may be reserved for plant conditions that are important, but do not require user action.

Warning type notification may be employed to notify the user that a condition exists. A warning type notification may be provided, in response to a particular plant condition, after a notice type notification has been either manually or automatically provided regarding the particular plant condition. The warning type notification may be provided if the particular condition continues to exist or has not otherwise been corrected or cleared. The behavior of a warning may be similar to the behavior of an alarm icon. The PNS may automatically clear warning type notifications.

Various embodiments of a PNS may provide nuisance alarms. A nuisance alarm may be am alarm notification that is repetitive in nature. In some embodiments a nuisance alarm repetitively provides audible and/or visual indications. For instance, a nuisance alarm may be provided in response to a critical plant condition, such as a predicted equipment failure event.

Notifications, including alarm type notifications may be state-based and/or state-dependent notifications. State-based notifications enable limiting the amount of notifications provided to users and prevent user overload conditions.

Figure 4A:
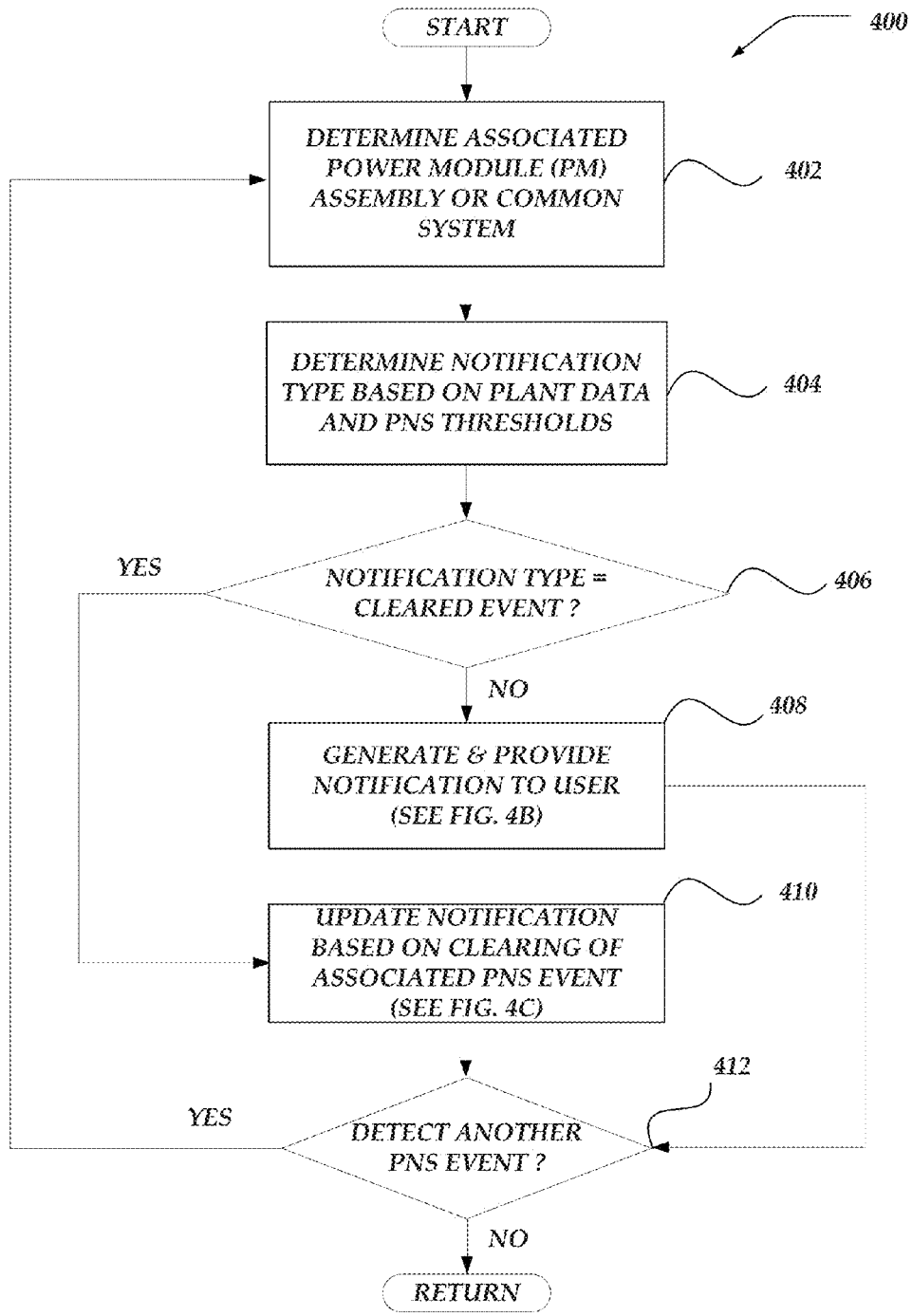
FIG. 4A shows an overview flowchart for providing a notification associated with a plant notification system event to a user that is consistent with the various embodiments.

FIG. 4A shows an overview flowchart for providing a notification associated with a plant notification system event to a user that is consistent with the various embodiment. After a start block, process 400 begins at block 402 where the PGM assembly an associated CS that is associated with a PNS event is determined. For instance, the PGM assembly or the CS associated with the PNS event detected at block 308 of process 300 of FIG. 3 is determined.

At block 404, the notification type corresponding to the PNS event is determined. The notification type may be based on at least a portion of the plant data acquired at block 306 of process 300 and the PNS thresholds. For example, the notification type may be based on the PNS threshold that either a PGM parameter or a CS parameter exceeded or fell below. If the PNS threshold that was exceeded is an alarm threshold, the notification type may be an alarm notification. Likewise, if the PNS threshold was a warning threshold, the notification type may be a warning notification. Other notification types include, but are not otherwise limited to notices, status indicators, events, and cleared events.

At decision block 406, it is determined if the notification type corresponding to the PNS event is a cleared event. For instance, when a user clears a previously provided notification, the PNS triggers a cleared event type for that notification. If the event type is not a cleared event then process 400 flows to block 408. If the notification type is a cleared event, then process 400 flows to block 410.

At block 408, a notification is generated and provided to the user. Various embodiments of generating a notification are discussed in the context of at least process 420 of FIG. 4B. The generated notification may be based on the notification type and the associated PGM assembly or CS. In some embodiments, an icon associated with the notification may be transitioned from a first state to a second state. In at least one embodiment, the icon is transitioned from a default state to the next state in a state diagram. For instance, if the notification type is an alarm notification, an alarm icon may be transitioned from a default state (such as state 702 in state diagram 700 of FIG. 7A) to the next state (such as state 704 in state diagram 700). If the notification type is a warning notification, a warning icon may be transitioned from a default state (such as state 712 in state diagram 710 of FIG. 7B) to the next state (such as state 714 in state diagram 710).

At block 410, the notification is updated based on the clearing of the associated PNS event. Various embodiments of updating a notification are discussed in the context of at least process 440 of FIG. 4C. However briefly, if the notification type is a cleared alarm notification, an alarm icon may be transitioned from a state (such as state 706 in state diagram 700 of FIG. 7A) to the next state (such as state 708 in state diagram 700). If the notification type is a cleared warning notification, a warning icon may be transitioned from a state (such as state 716 in state diagram 710 of FIG. 7B) to the next state (such as state 712 in state diagram 710).

At decision block 412, it is determined whether another PNS event is detected. In various embodiments, plant data is continued to be acquired after the detection of a first event. Various embodiments of acquiring plant data is described in the context of block 306 of process 300 of FIG. 3. If another PNS event is detected while continuing to acquire plant data, process 400 returns to block 402 to determine the associated PGM assembly of common system. Otherwise, process 400 may terminate and/or return to a calling process to perform other actions.

Figure 4B:
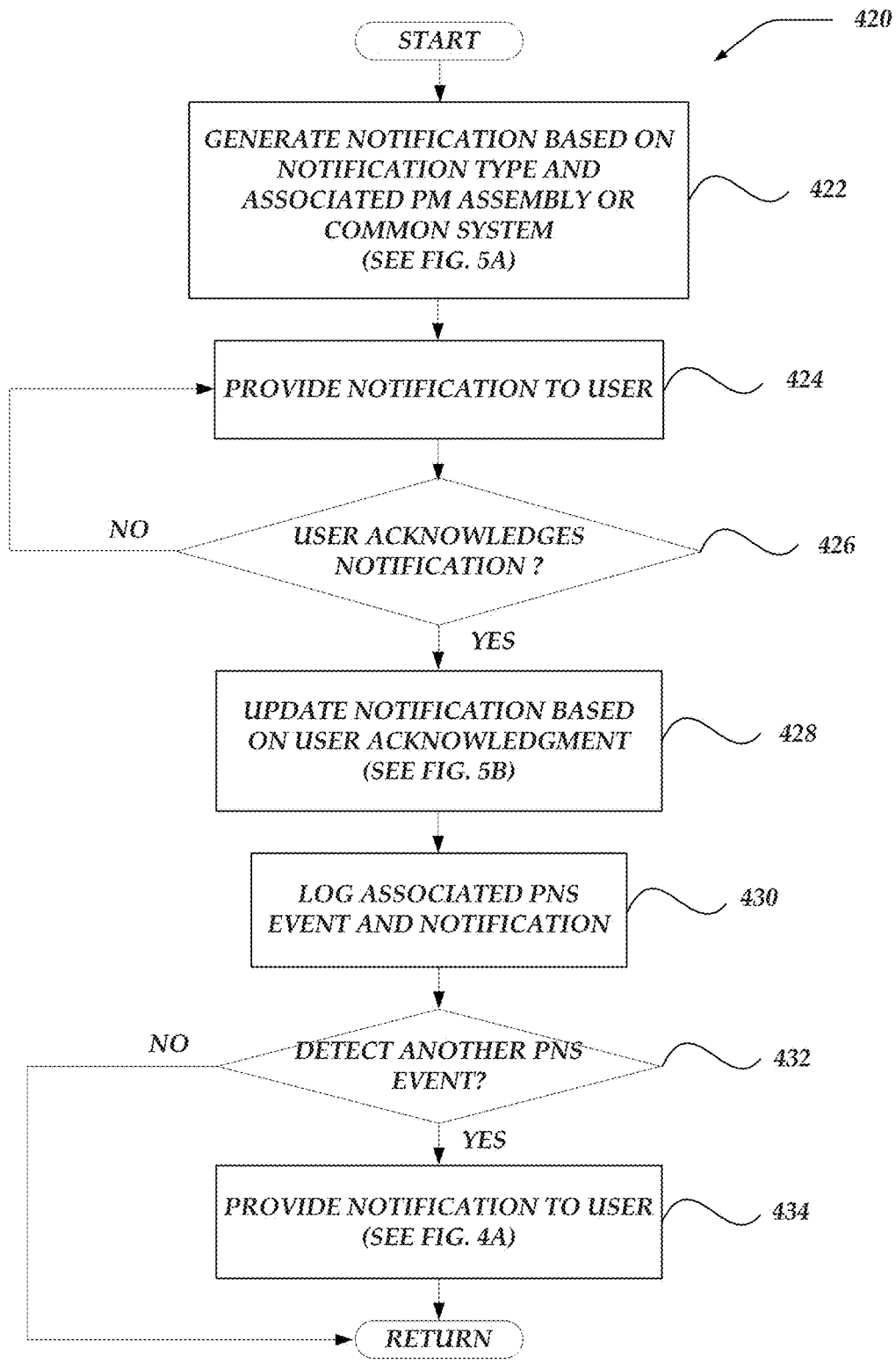
FIG. 4B shows an overview flowchart for generating a notification associated with a plant notification system event that is consistent with the various embodiments.

FIG. 4B shows an overview flowchart for generating a notification associated with a plant notification system event that is consistent with the various embodiments. Process 420 begins, after a start block, at block 422, a notification is generated. Various embodiments of generating a notification are discussed in the context of at least process 500 of FIG. 5A. The generated notification may be based on the notification type and the associated PGM assembly or CS. In some embodiments, an icon associated with the notification may be transitioned from a first state to a second state. In at least one embodiment, the icon is transitioned from a default state to the next state in a state diagram. For instance, if the notification type is an alarm notification, an alarm icon may be transitioned from a default state (such as state 702 in state diagram 700 of FIG. 7A) to the next state (such as state 704 in state diagram 700). If the notification type is a warning notification, a warning icon may be transitioned from a default state (such as state 712 in state diagram 710 of FIG. 7B) to the next state (such as state 714 in state diagram 710).

At block 424, the notification is provided to the user. In some embodiments, the notification is provided to the user via a traffic light included in a header bar of a UI. For example, if the notification is associated with a PGM assembly and is an alarm notification type, the notification may be provided via the alarm icon of the first traffic light 660 of header bar 652 of UI 650 of FIG. 6B.

At decision block 426, it is determined whether the user acknowledges the notification. If the user acknowledges the notification, process 420 flows to block 428. Otherwise, process 420 flows back to block 424, where the notification is continued to be provided to the user. It should be understood that another PNS event may be detected at any point in process 400. For instance, another PNS alarm and/or warning event may be detected before the user acknowledges the current event.

At block 428, the notification is updated based on the user's acknowledgment. Various embodiments of updating a notification are discussed in the context of at least process 520 of FIG. 5B. However briefly, if the notification type is an alarm notification, an alarm icon may be transitioned from a state (such as state 704 in state diagram 700 of FIG. 7A) to the next state (such as state 706 in state diagram 700). If the notification type is a warning notification, a warning icon may be transitioned from a state (such as state 714 in state diagram 710 of FIG. 7B) to the next state (such as state 716 in state diagram 710).

At block 430, the associated PNS event and/or the notification is logged. For instance, a data acquisition system (DAS), such as DAS 175 of FIG. 1C longs the associated PNS event and the notification is a database, such as PNS database 196.

At decision block 432, it is determined whether another PNS event is detected. In various embodiments, plant data is continued to be acquired after the detection of a first event. Various embodiments of acquiring plant data is described in the context of block 306 of process 300 of FIG. 3. If another PNS event is detected while continuing to acquire plant data, process 420 flows to block 434. Otherwise, process 420 may terminate and/or return to a calling process to perform other actions.

At block 434, a notification of the other PNS detected event is provided to the user. Various embodiments for providing one or more notifications are discussed in at least the context of process 400 of FIG. 4A. Process 420 may terminate and/or return to a calling process to perform other actions.

Figure 4C:
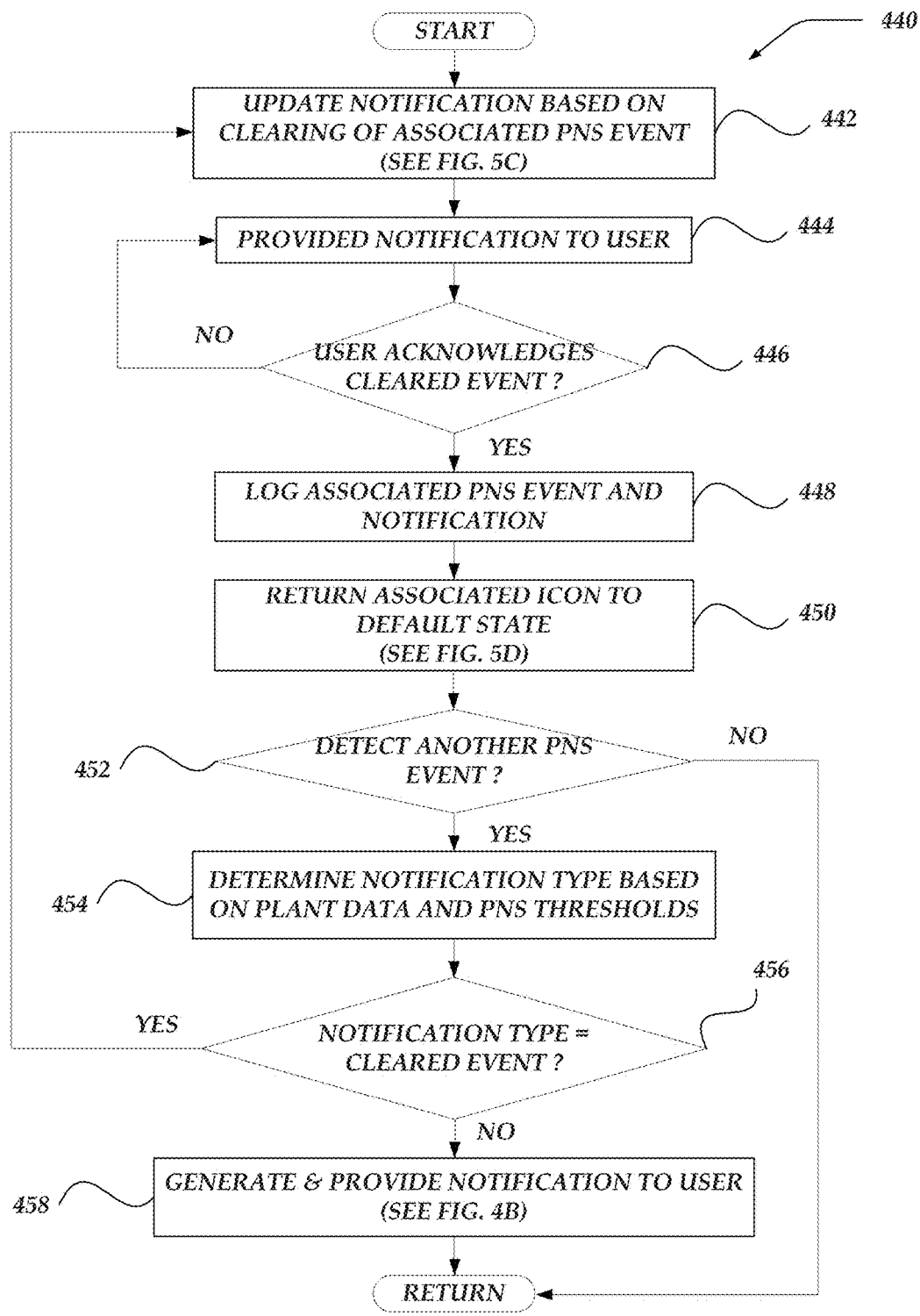
FIG. 4C shows an overview flowchart for clearing a notification associated with a plant notification system event that is consistent with the various embodiments.

FIG. 4C shows an overview flowchart for clearing a notification associated with a plant notification system event that is consistent with the various embodiments. Process 440 begins, after a start block, at block 442 where the notification is updated based on the clearing of the associated PNS event. Various embodiments of updating a notification are discussed in the context of at least process 540 of FIG. 5C. However briefly, if the notification type is an alarm notification, an alarm icon may be transitioned from a state (such as state 706 in state diagram 700 of FIG. 7A) to the next state (such as state 708 in state diagram 700). If the notification type is a warning notification, a warning icon may be transitioned from a state (such as state 716 in state diagram 710 of FIG. 7B) to the next state (such as state 712 in state diagram 710).

At block 444, a cleared notification event is generated and provided to the user. In some embodiments, the notification is provided to the user via a traffic light included in a header bar of a UI. For example, the cleared notification may be provided via the alarm icon of the first traffic light 660 of header bar 652 of UI 650 of FIG. 6B.

At decision block 446, it is determined whether the user acknowledges the PNS cleared event. If the user has not acknowledged the cleared event, process 440 may flow back to block 444 to continue to provide the user with the cleared event information. Otherwise, process 440 flows to block 448. It should be understood that another PNS event may be detected at any point in process 400. For instance, another PNS cleared event may be detected before the user acknowledged the previous event (between blocks 444 and 446).

At block 448, the associated PNS event and/or the notification is logged. The user acknowledging, clearing, or acknowledging the clearing of the event may be logged. For instance, a data acquisition system (DAS), such as DAS 175 of FIG. 1C longs the associated PNS event and the notification is a database, such as PNS database 196.

At block 450, the associated icon may be returned to the default state. Various embodiments returning an associated to a default state are discussed in the context of at least process 560 of FIG. 5D. However briefly, if the notification type is an alarm notification, an alarm icon may be transitioned from a state (such as state 708 in state diagram 700 of FIG. 7A) to the next state (such as state 702 in state diagram 700).

At decision block 452, it is determined whether another PNS event is detected. In various embodiments, plant data is continued to be acquired after the detection of a first event. Various embodiments of acquiring plant data is described in the context of block 306 of process 300 of FIG. 3. If another PNS event is detected while continuing to acquire plant data, process 440 returns to block 454. Otherwise, process 440 may terminate and/or return to a calling process to perform other actions.

At block 454, the notification type corresponding to the PNS event detected at block 452 is determined. The notification type may be based on at least a portion of the plant data acquired at block 306 of process 300 and the PNS thresholds. For example, the notification type may be based on the PNS threshold that either a PGM parameter or a CS parameter exceeded or fell below. If the PNS threshold that was exceeded is an alarm threshold, the notification type may be an alarm notification. Likewise, if the PNS threshold was a warning threshold, the notification type may be a warning notification. Other notification types include, but are not otherwise limited to notices, status indicators, events, and cleared events.

At decision block 456, it is determined if the notification type corresponding to the PNS event is a cleared event. For instance, when a user clears a previously provided notification, the PNS triggers a cleared event type for that notification. If the event type is not a cleared event then process 450 flows to block 458. If the notification type is a cleared event, then process 440 flows back to block 442.

At block 458, a notification is generated and provided to the user. Various embodiments of generating a notification are discussed in the context of at least process 420 of FIG. 4B. The generated notification may be based on the notification type and the associated PGM assembly or CS. In some embodiments, an icon associated with the notification may be transitioned from a first state to a second state. In at least one embodiment, the icon is transitioned from a default state to the next state in a state diagram. For instance, if the notification type is an alarm notification, an alarm icon may be transitioned from a default state (such as state 702 in state diagram 700 of FIG. 7A) to the next state (such as state 704 in state diagram 700). If the notification type is a warning notification, a warning icon may be transitioned from a default state (such as state 712 in state diagram 710 of FIG. 7B) to the next state (such as state 714 in state diagram 710). After execution of block 458, process 440 may terminate and/or return to a calling process to perform other actions.

Figure 5A:
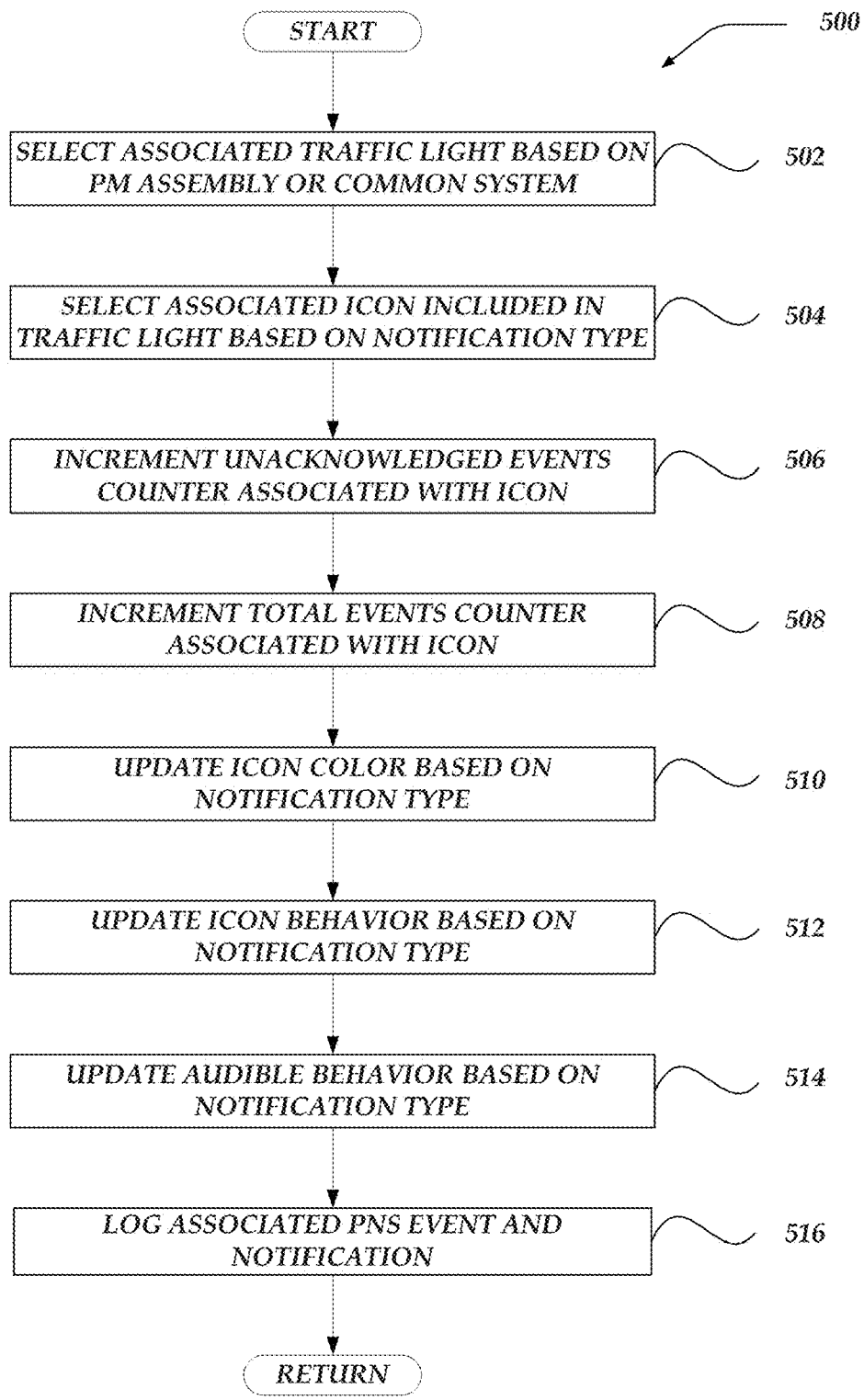
FIG. 5A shows an overview flowchart for generating a notification based on a notification type and an associated power-generation module assembly or a common system that is consistent with the various embodiments.

FIG. 5A shows an overview flowchart for generating a notification based on a notification type and an associated power-generation module assembly or a common system that is consistent with the various embodiments. At least portions of process 500 may be discussed in the context of a transition between state 702 to state 704 of state diagram 700 of FIG. 7A. At least portions of process 500 may be discussed in the context of a transition between state 712 to state 714 of state diagram 710 of FIG. 7B. After a start block, process 500 begins at block 502, where a traffic light that is associated with the PGM assembly or the CS is selected. For instance, if the PNS event is associated with a CS, then both a first and a second traffic light included in a header bar, such as header bar 652 of FIG. 6B is selected. If the PNS event is associated with a PGM assembly, then the first traffic light included in the header bar is selected.

At block 504, an icon associated with the notification type and included in the selected traffic light is selected. For instance, if the notification type is an alarm, an alarm icon, such as alarm icon 610 in traffic light 600 of FIG. 6A is selected. If the notification type is a warning, then a warning icon, such as warning icon 620 in traffic light 600 is selected. If the notification type is a notice, then the notice icon in traffic light 600 is selected.

At block 506, an unacknowledged events counter that is associated with the selected icon is incremented. At block 508, a total events counter that is associated with the selected icon may be incremented. At block 510, the color of the selected icon is updated. For instance, if the selected icon is an alarm icon, the color of the icon may be updated from white to red. If the selected icon is a warning icon, the color of the icon may be updated from white to yellow.

At block 512, the behavior of the selected icon is updated. For instance, if the selected icon is an alarm icon, the behavior of the icon may be updated from solid to flashing. If the selected icon is a warning icon, the behavior of the icon may be updated from solid to pulsing.

At block 514, an audible behavior of the notification may be updated based on the notification type. The sound and the length of the sound for the notification may be determined based on the notification type. For instance, if the notification type is an alarm, a constant tone may be provided. If the notification type is a warning, a short single tone may be provided. At block 516, the associated PNS event and/or notification is logged. For instance, a DAS, such as DAS 175 of FIG. 1C logs the associated PNS event and the notification is a database, such as PNS database 196. At block 516, the associated PNS event and/or the notification is logged. For instance, a data acquisition system (DAS), such as DAS 175 of FIG. 1C longs the associated PNS event and the notification is a database, such as PNS database 196. Process 500 may terminate and/or return to a calling process to perform other actions.

Figure 5B:
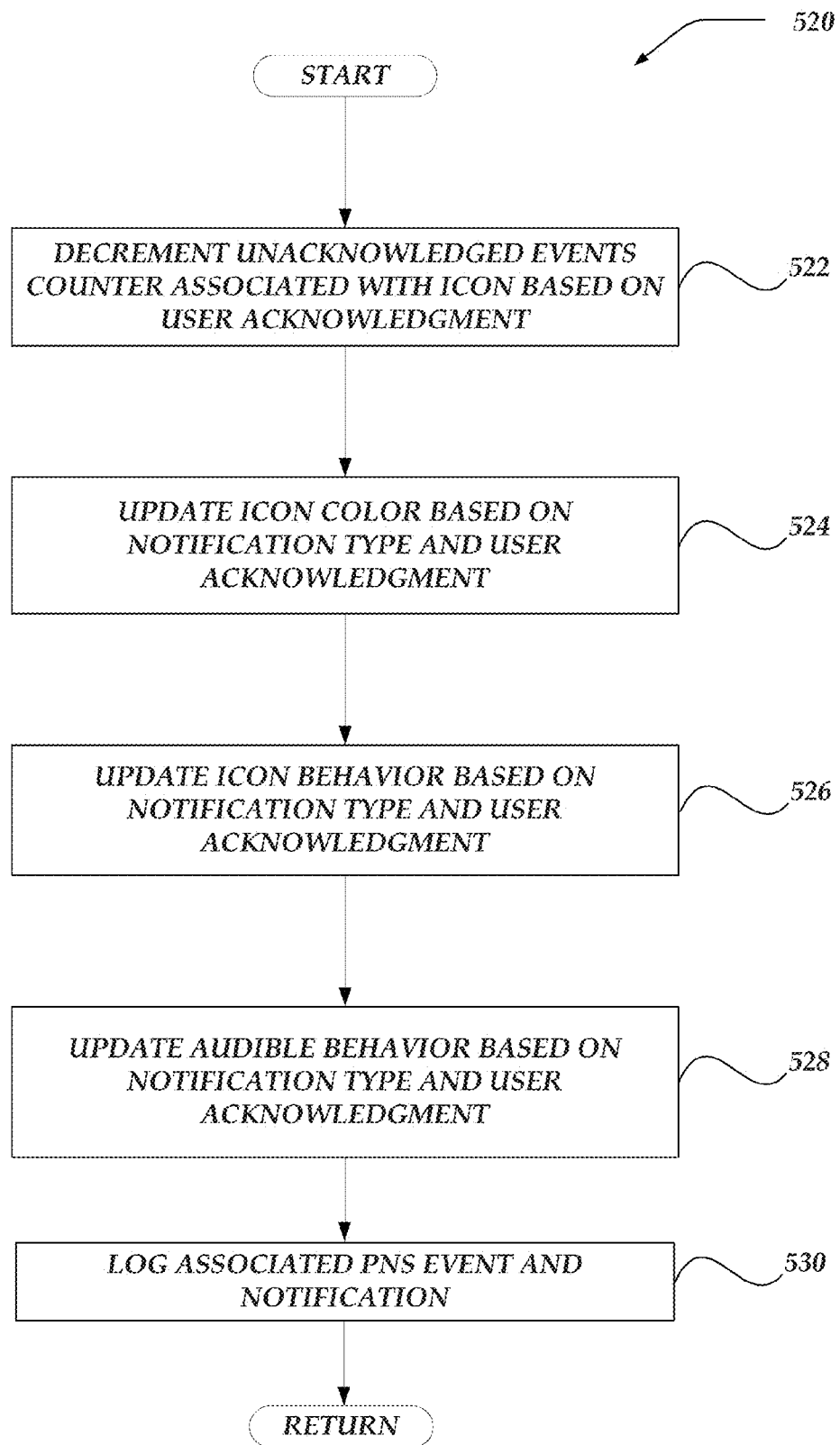
FIG. 5B shows an overview flowchart for updating a notification based on a user acknowledgment that is consistent with the various embodiments.

FIG. 5B shows an overview flowchart for updating a notification based on a user acknowledgment that is consistent with the various embodiments. At least portions of process 520 may be discussed in the context of a transition between state 704 to state 706 of state diagram 700 of FIG. 7A. At least portions of process 520 may be discussed in the context of a transition between state 714 to state 716 of state diagram 710 of FIG. 7B. After a start block, process 520 begins at block 522, where an unacknowledged events counter associated with the notification icon is decremented based on the user acknowledgment of the notification.

At block 524, the color of the icon is updated based in the user acknowledgment of the notification. In some embodiments, the color of the icon may remain unchanged when the user acknowledges the notification. At block 526, the behavior of the selected icon is updated. For instance, if the selected icon is an alarm icon, the behavior of the icon may be updated from flashing to solid. If the selected icon is a warning icon, the behavior of the icon may be updated from pulsing to solid. At block 528, the audible behavior of the notification may be updated based on the notification type and the user acknowledgment. For instance, if the notification type is an alarm, the audible tone may be shut off when the user acknowledges the notification. At block 530, the associated PNS event and/or notification acknowledgement is logged. For instance, a DAS, such as DAS 175 of FIG. 1C logs the associated PNS event and the notification is a database, such as PNS database 196. Process 520 may terminate and/or return to a calling process to perform other actions.

Figure 5C:
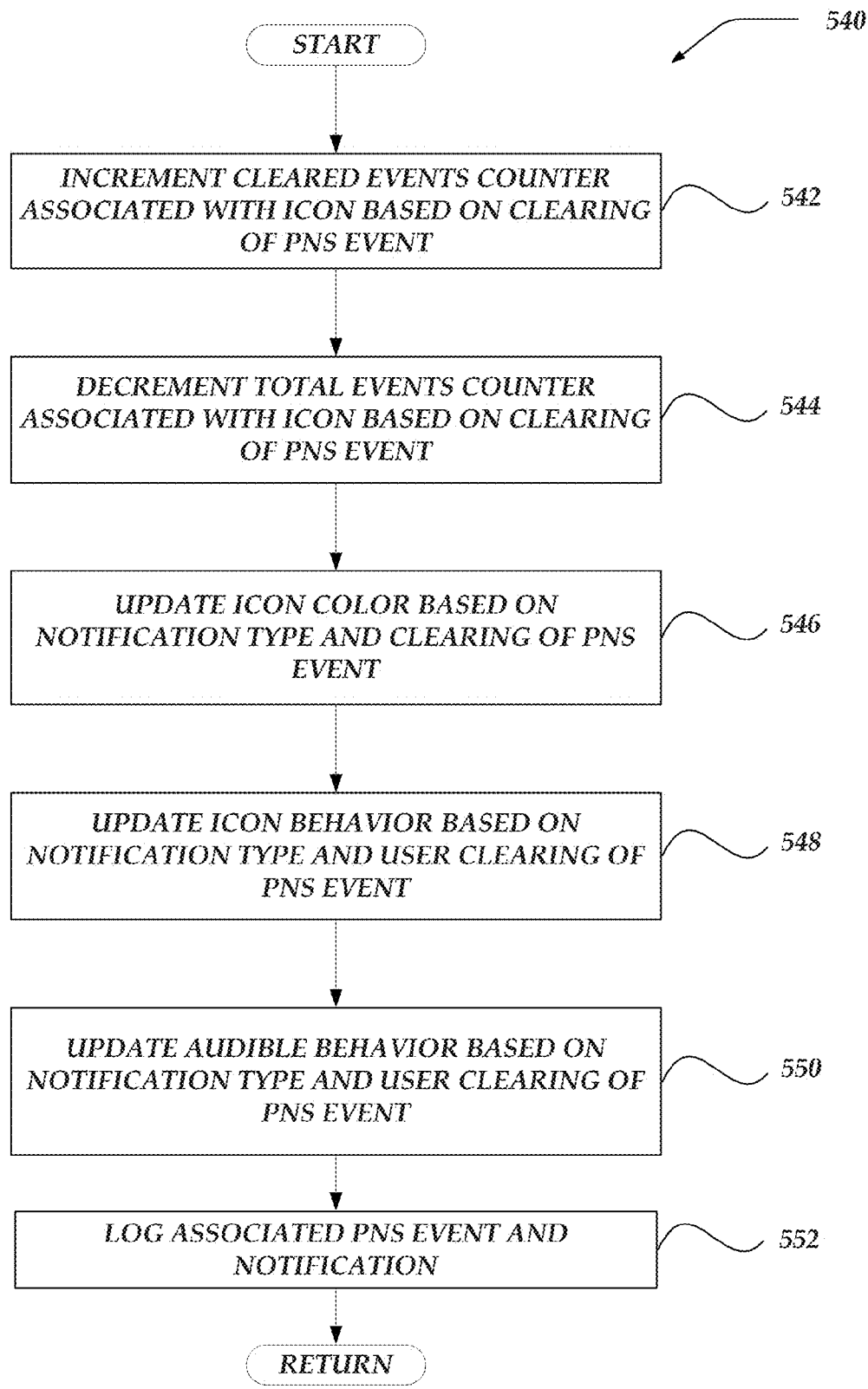
FIG. 5C shows an overview flowchart for updating a notification based on clearing of the associated plant notification system event that is consistent with the various embodiments.

FIG. 5C shows an overview flowchart for updating a notification based on clearing of the associated plant notification system event that is consistent with the various embodiments. At least portions of process 540 may be discussed in the context of a transition between state 706 to state 708 of state diagram 700 of FIG. 7A. At least portions of process 540 may be discussed in the context of a transition between state 716 to state 712 of state diagram 710 of FIG. 7B. For instance, if the notification type is a warning notification, the warning may be automatically cleared and the associated icon may be transitioned back to a default state. After a start block, process 540 begins at block 542, where a cleared events counter associated with the notification icon is incremented based on clearing the PNS event. At block 544, the total events counter associated with the notification icon is decremented based on clearing the PNS event.

At block 546, the icon color is updated based on the notification type and the clearing of the PNS event. For instance, if the notification type is an alarm, the color of the icon may be updated from red to green. At block 548, the behavior of the icon may be updated. In some embodiments, the behavior of the icon remains constant at block 548. At block 550, the audible behavior of the notification may be updated. In some embodiments, the audible behavior of the notification may remain constant at block 550. At block 552, the associated PNS event and/or notification is logged. For instance, a DAS, such as DAS 175 of FIG. 1C logs the associated PNS event and the notification is a database, such as PNS database 196. Process 540 may terminate and/or return to a calling process to perform other actions.

Figure 5D:
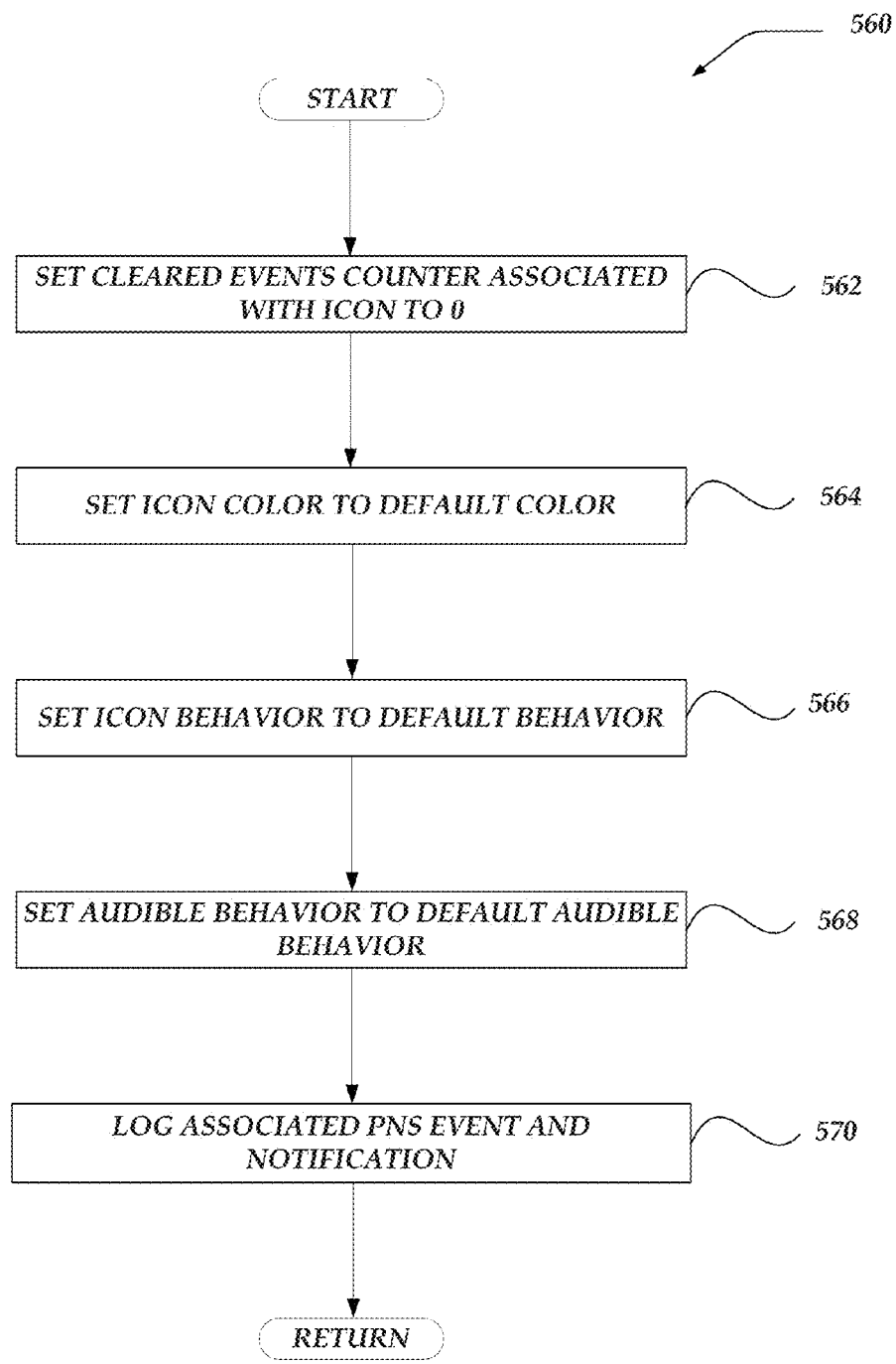
FIG. 5D shows an overview flowchart for returning an associated icon to a default state that is consistent with the various embodiments.

FIG. 5D shows an overview flowchart for returning an associated icon to a default state that is consistent with the various embodiments. At least portions of process 560 may be discussed in the context of a transition between state 708 to state 702 of state diagram 700 of FIG. 7A. At least portions of process 540 may be discussed in the context of a transition between state 716 to state 712 of state diagram 710 of FIG. 7B. Process 560 begins, after a start block, at block 562 where a cleared events counter associated with the notification icon set back to 0.

At block 564, a color of the icon is set or updated to a default color of the icon. For instance, if the icon is an alarm or warning icon, the color of the icon is set to white. At block 566, behavior of the icon is set or updated to a default behavior of the icon. In various embodiments, if the icon is an alarm or warning icon, the behavior of the icon is set to solid. At block 568, the audible behavior of the notification is set to a default value. For instance, any audible alarms may be turned off at block 568. At block 570, the associated PNS event and/or notification is logged. For instance, a DAS, such as DAS 175 of FIG. 1C logs the associated PNS event and the notification is a database, such as PNS database 196. Process 560 may terminate and/or return to a calling process to perform other actions.

FIG. 6A shows a traffic light 600 included in a PNS that provides notifications to users and is in accordance with at least one of the various embodiments. Traffic light 600 includes three exemplary notification icons: an alarm icon 610, a warning icon 620, and a notice icon 630.

In some embodiments, at least a portion of the icons includes one or more event counters. Event counters may display an integer, preferably a non-zero integer, that corresponds to the count of the number of associated events. Alarm icon 610 includes an alarm unacknowledged event counter 612, which indicates the number of unacknowledged alarm notifications, an alarm total event counter 614, which indicates the total number of alarm notifications that are in the current queue, and an alarm cleared events counter 616, which indicates the number of alarm notifications that have been cleared. As illustrated, in a preferred version the counters are located about the periphery of the alarm icon.

Similarly, warning icon 620 includes a warning unacknowledged event counter 622 and a warning total event counter 624, preferably positioned about the periphery of the warning icon. Notice icon 630 includes a notice total event counter 634, again preferably positioned at the periphery of the icon.

In some embodiments, a PNS differentiates notifications, notification types, and states of notifications via aspects of the associated icons, such as icon color, icon behavior, icon location/grouping and audible indications. At least a portion of the icons included in a traffic light may have one or more associated colors. The color of an icon may be used to differentiate different types of notifications, as well as a state of the notification. Icon behavior includes visual cues, such as but not limited to solid coloring, blinking, bold lettering, unique outlines, and highlighting. Icon behavior may also be used to differentiate between notification types and notification states. Alarm icon color 618, alarm icon behavior 619, warning icon color 628, and warning icon behavior 629 are schematically shown in the corresponding icons in traffic light 600.

Aspects of the audible indication may be varied to differentiate between notification types and states of notifications. For instance, the sound, the length of the sound, or other aspects may be used to provide the user an indication of the type and state of the notification. Groupings or the location of a UI, such as UI 650 of FIG. 6B may be used to differentiate notifications.

FIG. 6B shows a UI 650 employed to monitor the operation of a power plant and provide notifications to users in accordance with at least one of the various embodiments, where the UI 650 includes two instances of traffic lights: a first traffic light 660 and a second traffic light 670. Each of the first traffic light 660 and the second traffic light 670 may include similar features to traffic light 600 of FIG. 6A. The traffic lights 660/670 may be located in a header bar 652. The first traffic light 660 may be positioned in the center of header bar 652 and the second traffic light 670 may be positioned toward the right of header bar 652.

In some embodiments, the first traffic light 660 may provide notifications regarding the PGM assemblies included in the power plant, as well as CS to the power plant. In some embodiments, the second traffic light 670 may provide notifications regarding only the CSs. Display window 680 may enable a plant overview, as well as display, in real-time or near real-time, various PGM parameters and CS parameters.

The HSI may provide at least four (4) UIs displayed on four separate display devices. Each of the four UIs may include similar features to UI 650. For instance, each of the four UIs includes a header bar, such as header bar 650 wherein the header bars includes two traffic lights. The four UIs include at least a mandatory plant overview UI and three other UIs. Providing the mandatory plant overview UI provides the users with a consistent location for maintaining plant wide notification situational awareness.

The remaining UIs may enable a detailed investigation of a particular notification. When a user selects a particular PGM assembly to investigate, the first traffic light 660 will continue to display notifications regarding the PGM assemblies and the CS, while the second traffic light 670 will display notification information regarding the selected PGM assembly. Such embodiments provide a consistent location for the notifications.

FIG. 7A shows a state diagram 700 for the states of the alarm icon 610 included in the traffic light 600 of FIG. 6A. Transitions between states 702-708 may be induced by any of the processes discussed herein, including at least processes 300, 400, 500, 520, 540, and 560 of FIGS. 3-5D. Prior to an alarm type notification, an alarm icon starts in a default state 702. In at least one embodiment, in a default state 702, the color of a warning icon is white and the behavior is solid (or non-flashing). Each of the alarm unacknowledged event, total, and cleared event counters are set to zero.

When a PNS event is triggered that corresponds to an alarm notification, default state 702 transitions to state 704, where the color of the alarm icon transitions to red and the behavior transitions from solid to flashing. In state 704, an audible tone may be provided to the user. The alarm unacknowledged events counter and the alarm total events counter are each incremented by 1. At least portions of transitioning from state 702 to 704 may be discussed in conjunction with at least process 500 of FIG. 5A.

The alarm icon, including the audible tone will remain in state 704 until the user acknowledges the notification by selecting the alarm icon. In various embodiments, the user may acknowledge the alarm notification by selecting an acknowledgment provided via a drop down list under the alarm icone. Acknowledging the alarm notification indicates that the user is aware of the alarm and is investigating.

State 704 transitions to state 706 when the user has acknowledged the alarm notification, where the audible tone is turned off and the icon behavior transitions from flashing to solid. The icon color remains red and the unacknowledged events counter is decremented to display 0, while total events counter remains at the same count. At least portions of transitioning from state 704 to 706 may be discussed in conjunction with at least process 520 of FIG. 5B.

The alarm icon will remain in state 706 until another PNS event corresponding to an alarm type notification is detected or the event that triggered the alarm notification is cleared. Once the event is cleared, state 706 transitions to state 708. At least portions of transitioning from state 706 to 708 may be discussed in conjunction with at least process 540 of FIG. 5C. In cleared state, the icon color transition to green. The total events counter is decremented and the cleared events counter is incremented. The alarm icon will remain in state 706 until the notification is cleared. When the notification is cleared, alarm icon returns to default state 702. The alarm icon returns to default state 702 only when there are no other alarm notifications from a system perspective. At least portions of transitioning from state 708 to 702 may be discussed in conjunction with at least process 560 of FIG. 5D.

FIG. 7B shows a state diagram 710 for the states of a warning icon included in the traffic light of FIG. 6A. Transitions between states 712-716 may be induced by any of the processes discussed herein, including at least processes 300, 400, 500, 520, 540, and 560 of FIGS. 3-5D. Prior to a warning type notification, the warning icon starts in a default state 712. In at least one embodiment, in the default state 712, the color of a warning icon is white and the behavior is solid (or non-flashing). Each of the warning unacknowledged events and total events counters are set to zero. At least portions of transitioning from state 712 to 714 may be discussed in conjunction with at least process 500 of FIG. 5A.

When a PNS event is triggered that corresponds to a warning notification, default state 712 transitions to state 714, where the color of the warning icon transitions to yellow and the behavior transitions from solid to pulsing. In state 714, in at least one embodiment an audible tone may be provided to the user. The audible tone may be short in duration. In other embodiments, no audible indication is provided. The warning unacknowledged events counter and the warning total events counter are each incremented by 1.

The warning icon will remain in state 714 until the user acknowledges the notification by selecting the warning icon. In various embodiments, the user may acknowledge the warning notification by selecting an acknowledgment provided via a drop down list under the warning icon. Acknowledging the warning notification indicates that the user is aware of the warning and is investigating.

State 714 transitions to state 716, when the user has acknowledged the warning notification, where the icon behavior transitions from pulsing to solid. The icon color remains yellow and the unacknowledged events counter is decremented to display 0, while total events counter remains at the same count. At least portions of transitioning from state 714 to 716 may be discussed in conjunction with at least process 520 of FIG. 5B.

For a warning notification, the warning may be automatically cleared via the PNS. The automatic feature for clearing the warning is introduced here to take the burden away from the user. The PNS may log the notification with the DAS so that the time a warning clears is traceable. State 716 transitions back to the default state 712. The warning icon will reset the default state only if there are no other warnings notifications in the cue from a system perspective or plant alarms form a global plant perspective. At least portions of transitioning from state 716 to 712 may be discussed in conjunction with at least process 560 of FIG. 5D.

Notice type notifications may include message, such as but not limited to email messages. Such notice messages may notify the user that a process has begun to correct a plant condition. In various embodiments, the messages are manually are automatically generated. Such notices may be automatically logged via the DAS.

A notice icon, such as notice icon 630 of traffic light 600 of FIG. 6 may or may not change color and/or behavior when a notice notification is provided. In some embodiments, the only indication that will update on a notice icon is the total events counter, such as total events counter 634 of notice icon 630. Once the message is read, the counter may be decremented.

Regarding status indicators, status indicators may provide additional human factors to enable various HSI elements (components, parameters or system information) to standout under certain plant conditions). In an exemplary, but non-limiting embodiment, a component, such as a pump or valve, may be tagged out. A component icon, corresponding to the component may be updated with a status indicator to indicate the current status.

Such status indicators may provide real-time (or near real-time) indications of the state or status of the component. These indicators may be provided via a color change to the component icon. For instance, when a pump icon may change from gray to green color to indicate that the component is active. Rather than creating an additional color change to indicate that the component is tagged out for repair the pump icon may be surrounded by a red lasso border to indicate a danger tag and a yellow for a warning tag. This colored lasso technique can be added to any component, parameter, title or legend that needs to have its current abnormal status presented to the user.

Illustrative Computer Device

Figure 2:
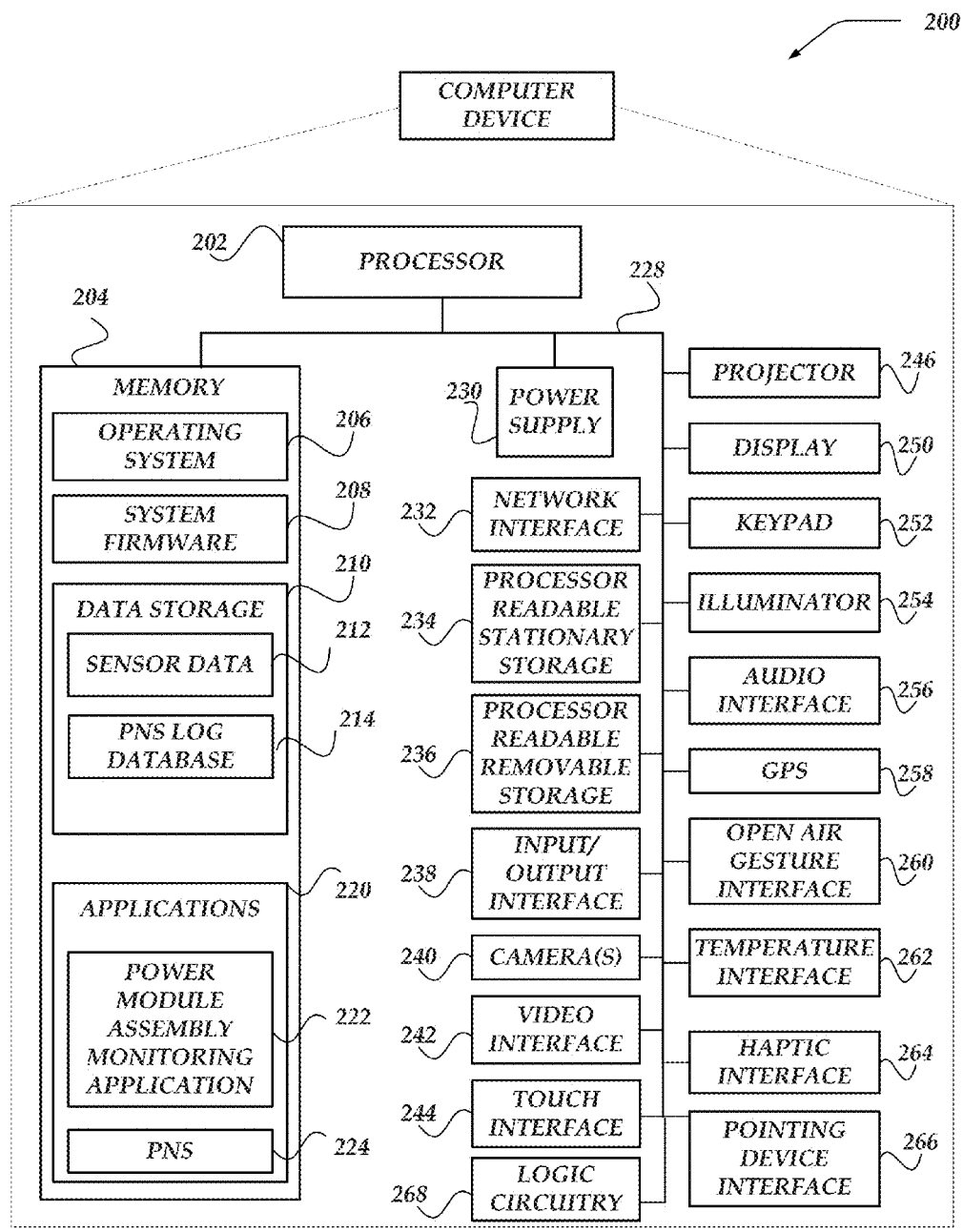
FIG. 2 shows an embodiment of a computer device that may be included in the modular power plant that is shown in FIG. 1B.

FIG. 2 shows one embodiment of computer device 200 that may include many more or less components than those shown. Computer device 200 may represent, for example, at least one embodiment of computer device 172 and/or computer device 178 of FIGS. 1B-1C.

Computer device 200 may include processor 202, such as a central processing unit (CPU), in communication with memory 204 via bus 228. Computer device 200 may also include power supply 230, network interface 232, processor-readable stationary storage device 234, processor-readable removable storage device 236, input/output interface 238, camera(s) 240, video interface 242, touch interface 244, projector 246, display 250, keypad 252, illuminator 254, audio interface 256, global positioning systems (GPS) receiver 258, open air gesture interface 260, temperature interface 262, haptic interface 264, pointing device interface 266, or the like. Computer device 200 may optionally communicate with a base station (not shown), or directly with another computer. And in one embodiment, although not shown, an accelerometer or gyroscope may be employed within computer device 200 to measuring and/or maintaining an orientation of computer device 200.

Additionally, in one or more embodiments, the computer device 200 may include logic circuitry 268. Logic circuitry 268 may be an embedded logic hardware device in contrast to or in complement to processor 202. The embedded logic hardware device would directly execute its embedded logic to perform actions, e.g., an ASIC), FPGA, or others.

Also, in one or more embodiments (not shown in the figures), the mobile computer may include a hardware microcontroller instead of a CPU. In at least one embodiment, the microcontroller would directly execute its own embedded logic to perform actions and access its own internal memory and its own external Input and Output Interfaces (e.g., hardware pins and/or wireless transceivers) to perform actions, such as System On a Chip (SOC), or others.

Power supply 230 may provide power to computer device 200. A rechargeable or non-rechargeable battery may be used to provide power. The power may also be provided by an external power source, such as an AC adapter or a powered docking cradle that supplements and/or recharges the battery.

Network interface 232 includes circuitry for coupling computer device 200 to one or more networks, and is constructed for use with one or more communication protocols and technologies including, but not limited to, protocols and technologies that implement any portion of the OSI model, GSM, CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (NIC).

In various embodiments, network interface 232 is enabled to receive one or more signals originating in diagnostics sensors included in one or more PGM assemblies, such as but not limited to diagnostic sensors 140 of PGM assembly 100 of FIG. 1A. Network interface 232 may interface with a MCS network, such as but not limited to MCS network 198 of FIG. 1C. In at least one embodiment, as described in conjunction with at least FIGS. 1B and 1C, network interface 232 receives the one or more signals from the diagnostic sensors by way of a MPS, such as but not limited to MPS 180 of FIG. 1 and through the MCS network 198. Network interface 232 may be enabled to both receive and transmit signals via the MCS network.

Audio interface 256 may be arranged to produce and receive audio signals such as the sound of a human voice. For example, audio interface 256 may be coupled to a speaker and microphone (not shown) to enable telecommunication with others and/or generate an audio acknowledgement for some action. A microphone in audio interface 256 can also be used for input to or control of computer device 200, e.g., using voice recognition, detecting touch based on sound, or other techniques.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch and/or gestures. Display 250 may display a user interface, such as but not limited to a graphical display.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication and/or provide light. Illuminator 254 may remain active for specific periods of time or in response to events. For example, when illuminator 254 is active, it may backlight the buttons on keypad 252 and stay on while the mobile device is powered. Also, illuminator 254 may backlight these buttons in various patterns when particular actions are performed, such as dialing another mobile computer. Illuminator 254 may also cause light sources positioned within a transparent or translucent case of the mobile device to illuminate in response to actions.

Computer device 200 may also comprise input/output interface 238 for communicating with external peripheral devices or other computers such as other mobile computers and network computers. Input/output interface 238 may enable computer device 200 to communicate with one or more other computer devices. In some embodiments, input/output interface 238 may enable computer device 200 to connect and communicate with one or more network computers. Other peripheral devices that computer device 200 may communicate with may include remote speakers (to provide user alerts) and/or microphones, headphones, display screen glasses, or the like. Input/output interface 238 can utilize one or more technologies, such as Universal Serial Bus (USB), Infrared, Wi-Fi, WiMax, Bluetooth™, or wired technologies.

Haptic interface 264 may be arranged to provide tactile feedback to a user of a computer device 200. For example, the haptic interface 264 may be employed to vibrate computer device 200 in a particular way when another user of a computer is calling. Temperature interface 262 may be used to provide a temperature measurement input and/or a temperature changing output to a user of computer device 200. Open air gesture interface 260 may sense physical gestures of a user of computer device 200, for example, by using single or stereo video cameras, radar, a gyroscopic sensor inside a computer held or worn by the user, or the like. Camera 240 may be used to track physical eye movements of a user of computer device 200.

GPS transceiver 258 can determine the physical coordinates of computer device 200 on the surface of the Earth, which typically outputs a location as latitude and longitude values. Physical coordinates of a mobile computer that includes a GPS transceiver may be referred to as geo-location data. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of computer device 200 on the surface of the Earth. It is understood that under different conditions, GPS transceiver 258 can determine a physical location for computer device 200. In at least one embodiment, however, computer device 200 may, through other components, provide other information that may be employed to determine a physical location of the mobile computer, including for example, a Media Access Control (MAC) address, or an IP address.

In at least one embodiment, GPS transceiver 258 is employed for localization of the various embodiments discussed herein. For instance, the various embodiments may be localized, via GPS transceiver 258, to customize the linguistics, technical parameters, time zones, configuration parameters, units of measurement, or monetary units based on the location of a user of computer device 200. In a least one embodiment, a localization of at least a portion of any application included in computer device 200 is performed based on at least the geo-location data or other data acquired by GPS transceiver 258 or other sensors included in computer device 200. For instance, time zone parameters, currency type, units, language parameters, or others are set or otherwise configured in various portions of software included in one or more mobile computers. Furthermore, any process discussed herein, including but not limited to any process discussed in the context of any flowchart described herein, may be localized as such.

Human interface components can be peripheral devices that are physically separate from computer device 200, allowing for remote input and/or output to computer device 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, or projectors. These peripheral components may communicate over a Pico Network such as Bluetooth™ or Zigbee™. One non-limiting example of a mobile computer with such peripheral human interface components is a wearable computer, which might include a remote pico projector along with one or more cameras that remotely communicate with a separately located mobile computer to sense a user's gestures toward portions of an image projected by the pico projector onto a reflected surface such as a wall or the user's hand.

A computer device 200 may include a browser application that is configured to receive and to send web pages, web-based messages, graphics, text, or multimedia. Mobile computer's 200 browser application may employ virtually any programming language, including a wireless application protocol messages (WAP). In at least one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), or HTML5.

In various embodiments, the browser application may be configured to enable a user to log into an account and/or user interface to access/view content data.

Memory 204 may include RAM, ROM, and/or other types of memory. Memory 204 illustrates an example of computer-readable storage media (devices) for storage of information such as computer-readable instructions, data structures, program modules or other data. Memory 204 may store system firmware 208 (e.g., BIOS) for controlling low-level operation of computer device 200. The memory may also store operating system 206 for controlling the operation of computer device 200. It will be appreciated that this component may include a general-purpose operating system such as a version of UNIX, or LINUX™, or a specialized mobile computer communication operating system such as Windows Phone™, or the Symbian® operating system. The operating system may include, or interface with a Java virtual machine module that enables control of hardware components and/or operating system operations via Java application programs.

Memory 204 may further include one or more data storage 210, which can be utilized by computer device 200 to store, among other things, applications 220 and/or other data. Data storage 210 may store sensor data 212 generated and/or provided by one or more diagnostic sensors, such as but not limited to diagnostic sensors 140 of PGM assembly 100 of FIG. 1A. Data storage may include a PNS log database 214. Data storage 210 may further include program code or data, algorithms, for use by a processor, such as processor 202 to execute and perform actions. In one embodiment, at least some of data storage 210 might also be stored on another component of computer device 200, including, but not limited to, non-transitory processor-readable removable storage device 236, processor-readable stationary storage device 234, or even external to the mobile device. Removable storage device 236 may be a USB drive, USB thumb drive, dongle, or the like.

Applications 220 may include computer executable instructions which, when executed by computer device 200, transmit, receive, and/or otherwise process instructions and data. Applications 220 may include PGM assembly monitoring application 222, which may be provide computer executable instructions, which when executed by computer device 200, or another computer device, may enable actions discussed in conjunction with any of the processes discussed herein, including but not limited to processes 300, 400, 500, 520, 540, and 560 of FIGS. 3-5D respectively. Applications 220 may include PNS 224. PNS 224 may enable actions discussed in conjunction with any of the processes discussed herein, including but not limited to processes 300, 400, 500, 520, 540, and 560 of FIGS. 3-5D respectively.

Other examples of application programs that may be included in applications 220 include, but are not limited to, calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

In some embodiments, computer device 200 may be enabled to employ various embodiments, combinations of embodiments, processes, or parts of processes, as described herein. Moreover, in various embodiments, computer device 200 may be enabled to employ various embodiments described above in conjunction with computer devices 172 and 178 of FIGS. 1B-1C and/or any of the processes 300, 400, 500, 520, 540, and 560 described in conjunction with FIGS. 3-45D, as well as providing any of the user interfaces described herein, including at least UI 650 of FIG. 6B.

It will be understood that each block of the flowchart the illustrations, and combinations of blocks in the flowchart illustrations, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowcharts to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Additionally, in one or more steps or blocks, may be implemented using embedded logic hardware, such as, an ASIC, FPGA, Programmable Array Logic (PAL), or the like, or combination thereof, instead of a computer program. The embedded logic hardware may directly execute embedded logic to perform actions some or all of the actions in the one or more steps or blocks. Also, in one or more embodiments (not shown in the figures), some or all of the actions of one or more of the steps or blocks may be performed by a hardware microcontroller instead of a CPU. In at least one embodiment, the microcontroller may directly execute its own embedded logic to perform actions and access its own internal memory and its own external Input and Output Interfaces (e.g., hardware pins and/or wireless transceivers) to perform actions, such as SOC.

The above specification, examples, and data provide a complete description of the manufacture and use of the composition of the invention. Since many embodiments of the invention can be made without departing from the spirit and scope of the invention, the invention resides in the claims hereinafter appended.

The embodiments of the invention in which an exclusive property or privilege is claimed are defined as follows:

1. A system for managing notifications for a modular power plant that includes one or more power-generation module (PGM) assemblies and one or more common-systems (CS), the system comprising:
   a transceiver that receives data over a network;
   a display device that displays a graphical display;
   a memory that stores at least instructions; and
   a processor device that executes instructions that perform actions, the actions comprising:
      receiving power plant data over the network, wherein the power plant data includes signals generated by one or more sensors included in at least one of the PGM assemblies or one of the CS;
      detecting an event based on the power plant data and one or more notification thresholds;
      in response to the event, determining a notification type based on the data and the one or more notification thresholds;
      providing a notification to a user via the graphical display based on the notification type and the event;
   enabling the user to acknowledge the notification;
   selecting an icon that is included in the graphical display based on the notification type;
   incrementing an unacknowledged events counter associated with the icon;
   incrementing a total events counter associated with the icon; and
   updating at least one of a behavior or a color of the icon based on the event.

2. The system of claim 1, the actions further comprising:
   in response to the user acknowledging the notification, decrementing an unacknowledged events counter that is based on an icon associated with the notification type; and
   in response to the user acknowledging the notification, updating at least one of a behavior or a color of the icon.

3. The system of claim 1, the actions further comprising:
   in response to a clearing of the event, decrementing a total events counter that is based on an icon associated with the notification type; and
   in response to the clearing of the event, updating at least one of a behavior or a color of the icon.

4. The system of claim 1, the actions further comprising:
   selecting a traffic light included in the graphical display based at least one of the PGM assemblies or one of the CS that is associated with the event; and
   updating an icon included in the traffic light based on the notification type.

5. The system of claim 1, wherein providing the notification includes providing an audible indication based on the notification type.

6. The system of claim 1, the actions further comprising:
automatically logging the notification in a database.

7. A method for managing notifications for a modular power plant that includes one or more power-generation module (PGM) assemblies and one or more common-systems (CS), the method comprising:
- detecting an event based on the power plant data, received over a network, and one or more notification thresholds, wherein the power plant data includes signals generated by one or more sensors included in at least one of the PGM assemblies or one of the CS;
- in response to the event, determining a notification type based on the power plant data and a plurality of notification thresholds;
- providing a notification to a user, wherein providing the notification includes:
  - selecting an icon that is included in the graphical display based on the notification type;
  - incrementing at least one of an unacknowledged events counter associated with the icon or a total events counter associated with the icon; and
  - updating at least one of a behavior or a color of the icon based on the event; and
- logging the notification in a database.

8. The method of claim 7, wherein determining the notification type includes:
- determining a plant notification system (PNS) threshold included in the plurality of thresholds, wherein a value in the power plant data is greater than the PNS threshold; and
- determining the notification type based on a comparison between the value in the power plant data and the PNS threshold.

9. The method of claim 7, further comprising:
- determining an event priority for the event based on an immediacy of a required user action associated with the event and a plurality of immediacies of required user actions associated with a plurality of other detected events; and
- providing the notification to the user based on the event priority.

10. The method of claim 7, wherein the notification type is determined among a plurality of notification types that includes at least a first notification type and a second notification type and the plurality of notification types are arranged in a tiered hierarchy, wherein the first notification type is above the seconded notification type in the tiered hierarchy, and providing the notification to the user further includes:
- when the notification type is the first notification type, providing a constant audible indication to the user; and
- when the notification type is the second notification type, providing a short single audible indication to the user.

11. The method of claim 7, further comprising:
enabling the user to customize the notification by providing at least a portion of the plurality of PNS thresholds.

12. The method of claim 7, further comprising:
updating another icon included in the graphical display based on a current status of a component included in the one or more PGM assemblies or the one or more CS, wherein the other icon is associated with the component and the updated other icon includes a status indicator indicating the current status of the component.

13. The method of claim 7, wherein updating the behavior of the icon includes transitioning the icon from a solid icon to a flashing icon.

14. The method of claim 7, further comprising:
when a condition associated with the event persists for a predetermined time, providing another notification to the user based on another notification type, wherein the other notification type is associated with a higher ranking in a tiered hierarchy of notification types than the notification type.

15. A system for managing notifications for a modular power plant that includes one or more power-generation module (PGM) assemblies and one or more common-systems (CS), the system comprising:
- a transceiver that receives data over a network;
- a display device that displays a graphical display;
- a memory that stores at least instructions; and
- a processor device that executes instructions that perform actions, the actions comprising:
  - receiving power plant data over the network, wherein the power plant data includes signals generated by one or more sensors included in at least one of the PGM assemblies or one of the CS;
  - detecting an event based on the power plant data and one or more notification thresholds;
  - in response to the event, determining a notification type based on the data and the one or more notification thresholds;
  - providing a notification to a user via the graphical display based on the notification type and the event;
  - enabling the user to acknowledge the notification;
  - in response to the user acknowledging the notification, decrementing an unacknowledged events counter that is based on an icon associated with the notification type; and
  - in response to the user acknowledging the notification, updating at least one of a behavior or a color of the icon.

16. The system of claim 15, the actions further comprising:
- in response to a clearing of the event, decrementing a total events counter that is based on an icon associated with the notification type; and
- in response to the clearing of the event, updating at least one of a behavior or a color of the icon.

17. The system of claim 15, the actions further comprising:
- selecting a traffic light included in the graphical display based at least one of the PGM assemblies or one of the CS that is associated with the event; and
- updating an icon included in the traffic light based on the notification type.

18. The system of claim 15, wherein providing the notification includes providing an audible indication based on the notification type.

19. The system of claim 15, the actions further comprising:
automatically logging the notification in a database.

20. A system for managing notifications for a modular power plant that includes one or more power-generation module (PGM) assemblies and one or more common-systems (CS), the system comprising:
- a transceiver that receives data over a network;
- a display device that displays a graphical display;
- a memory that stores at least instructions; and
- a processor device that executes instructions that perform actions, the actions comprising:
  - receiving power plant data over the network, wherein the power plant data includes signals generated by one or more sensors included in at least one of the PGM assemblies or one of the CS;
detecting an event based on the power plant data and one or more notification thresholds;
in response to the event, determining a notification type based on the data and the one or more notification thresholds;
providing a notification to a user via the graphical display based on the notification type and the event;
enabling the user to acknowledge the notification;
in response to a clearing of the event, decrementing a total events counter that is based on an icon associated with the notification type; and
in response to the clearing of the event, updating at least one of a behavior or a color of the icon.

21. The system of claim 20, the actions further comprising:
in response to the user acknowledging the notification, decrementing an unacknowledged events counter that is based on an icon associated with the notification type; and
in response to the user acknowledging the notification, updating at least one of a behavior or a color of the icon.

22. The system of claim 20, the actions further comprising:
selecting a traffic light included in the graphical display based at least one of the PGM assemblies or one of the CS that is associated with the event; and
updating an icon included in the traffic light based on the notification type.

23. The system of claim 20, wherein providing the notification includes providing an audible indication based on the notification type.

24. The system of claim 20, the actions further comprising:
automatically logging the notification in a database.

25. A system for managing notifications for a modular power plant that includes one or more power-generation module (PGM) assemblies and one or more common-systems (CS), the system comprising:
a transceiver that receives data over a network;
a display device that displays a graphical display;
a memory that stores at least instructions; and
a processor device that executes instructions that perform actions, the actions comprising:
receiving power plant data over the network, wherein the power plant data includes signals generated by one or more sensors included in at least one of the PGM assemblies or one of the CS;
detecting an event based on the power plant data and one or more notification thresholds;
in response to the event, determining a notification type based on the data and the one or more notification thresholds;
providing a notification to a user via the graphical display based on the notification type and the event;
enabling the user to acknowledge the notification;
selecting a traffic light included in the graphical display based at least one of the PGM assemblies or one of the CS that is associated with the event; and
updating an icon included in the traffic light based on the notification type.

26. The system of claim 25, the actions further comprising:
in response to the user acknowledging the notification, decrementing an unacknowledged events counter that is based on an icon associated with the notification type; and
in response to the user acknowledging the notification, updating at least one of a behavior or a color of the icon.

27. The system of claim 25, the actions further comprising:
in response to a clearing of the event, decrementing a total events counter that is based on an icon associated with the notification type; and
in response to the clearing of the event, updating at least one of a behavior or a color of the icon.

28. The system of claim 25, wherein providing the notification includes providing an audible indication based on the notification type.

29. The system of claim 25, the actions further comprising:
automatically logging the notification in a database.

* * * * *

UNITED STATES PATENT AND TRADEMARK OFFICE
CERTIFICATE OF CORRECTION

| | | |
|---|---|---|
| PATENT NO. | : 10,191,464 B2 | Page 1 of 1 |
| APPLICATION NO. | : 14/994255 | |
| DATED | : January 29, 2019 | |
| INVENTOR(S) | : Ross Snuggerud and Kevin LaFerriere | |

It is certified that error appears in the above-identified patent and that said Letters Patent is hereby corrected as shown below:

In the Specification

Column 1, Line 15, before FIELD OF THE INVENTION insert:
-- GOVERNMENT INTEREST
This invention was made with Government support under Contract No. DE-NE0000633 awarded by the Department of Energy. The Government has certain rights in this invention. --

Signed and Sealed this
Fifth Day of March, 2019

Andrei Iancu
*Director of the United States Patent and Trademark Office*